(12) United States Patent
Miyashita

(10) Patent No.: US 8,141,938 B2
(45) Date of Patent: Mar. 27, 2012

(54) FORMED ARTICLE FOR VEHICLE BODY STRUCTURAL MEMBER

(75) Inventor: Toshiya Miyashita, Northvill, MI (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 326 days.

(21) Appl. No.: 12/312,710

(22) PCT Filed: Oct. 7, 2008

(86) PCT No.: PCT/IB2008/002646
§ 371 (c)(1),
(2), (4) Date: May 22, 2009

(87) PCT Pub. No.: WO2009/050553
PCT Pub. Date: Apr. 23, 2009

(65) Prior Publication Data
US 2010/0052367 A1    Mar. 4, 2010

(30) Foreign Application Priority Data
Oct. 17, 2007    (JP) .................................. 2007-270291

(51) Int. Cl.
*B62D 25/02* (2006.01)
(52) U.S. Cl. .............................. 296/193.06; 296/203.03
(58) Field of Classification Search ............... 296/146.6, 296/203.03, 210, 30, 193.06; 293/102, 120–121
See application file for complete search history.

(56) References Cited

U.S. PATENT DOCUMENTS

| 4,458,936 A * | 7/1984 | Mulholland ............... 296/180.4 |
| 7,967,253 B2 * | 6/2011 | Ferguson et al. ............. 244/130 |
| 2005/0212333 A1 | 9/2005 | Mally et al. |
| 2006/0082040 A1 | 4/2006 | Shimizu et al. |
| 2007/0200314 A1 | 8/2007 | Anderson et al. |

FOREIGN PATENT DOCUMENTS

| DE | 197 35 640 A1 | 2/1999 |
| DE | 100 37 492 A1 | 3/2001 |
| JP | A-10-316017 | 12/1998 |
| JP | A-2005-231496 | 9/2005 |
| JP | A-2006-281312 | 10/2006 |

OTHER PUBLICATIONS

Sep. 1, 2011 Office Action issued in Japanese Patent Application No. 2008-265590, with translation.

* cited by examiner

*Primary Examiner* — Dennis Pedder
(74) *Attorney, Agent, or Firm* — Oliff & Berridge, PLC

(57) ABSTRACT

A formed article for a vehicle body structural member includes: a first gradually varying portion that is curved around an axis extending in a width direction of a top wall portion and the width of the top wall portion varies; and a second gradually varying portion in which the width of a leg wall portion varies so as to cancel the variation in the width of the top wall portion in the first gradually varying portion. The shape of a gradually-varying-portion ridge that is a boundary between the first gradually varying portion and the second gradually varying portion is made substantially the same both in a plan view that is viewed along the thickness direction of the top wall portion and in a side view that is viewed along the width direction of the top wall portion.

25 Claims, 12 Drawing Sheets

FORMED ARTICLE FOR VEHICLE BODY STRUCTURAL MEMBER

BACKGROUND OF THE INVENTION

1. Field of the Invention

The invention relates to a formed article for a vehicle body structural member that is a component of a vehicle body, and in particular, to a formed article for a vehicle body structural member that is formed of a steel plate with tensile strength higher than that of a normal steel plate (high tensile steel plate) or a steel plate with a tensile strength further higher than that of such a high tensile steel plate (super high tensile steel plate).

2. Description of the Related Art

Japanese Patent Application Publication No. 2006-281312 (JP-A-2006-281312), for example, discloses a vehicle body structural member, such as a roof side rail outer reinforcement that is disposed along a roof side of a vehicle body, and a center pillar upper or lower reinforcement that is disposed along a center pillar, the vehicle body structural member being formed to have a hat-shaped cross section that is open toward one side in the lateral direction of the vehicle. A vehicle body structural member with such a configuration is formed by drawing (pressing) a flat steel plate.

In recent years, a so-called "high tensile steel plate" that has a tensile strength higher than that of a normal steel plate is used for such a vehicle body structural member. Moreover, consideration is given to the use of a so-called "super high tensile steel plate" that has a tensile strength further higher than that of the high tensile steel plate.

Meanwhile, with regard to the roof side rail outer reinforcement, the center pillar upper reinforcement, the center pillar lower reinforcement, etc. the height of the cross section, that is, the height from the flange portion to the top wall portion of a hat shape, may vary at certain positions along the longitudinal direction (the vehicle height direction when the vehicle body is assembled) according to the design, the mechanical strength, the rigidity, etc. of a vehicle.

If the flat steel plate is formed into such a shape by drawing (pressing), in the top wall portion, compressive residual stress occurs in the width direction in the portion in which the height of the cross section is high, and tensile residual stress occurs in the width direction in the portion in which the height of the cross section is low. When such residual stress occurs, the dimensional accuracy is deteriorated, that is, for example, a "twist" occurs around an axis extending in the longitudinal direction of the top wall portion, and/or "wrinkles" occur in some portions, after forming the member.

The problem, such as the deterioration of the dimensional accuracy, that occurs after forming becomes severe when a "high tensile steel plate" is used, which has a tensile strength higher than a normal steel plate, and becomes more severe when a so-called "super high tensile steel plate" is used, which has a tensile strength higher than a high tensile steel plate, and it becomes difficult to obtain a desired shape.

SUMMARY OF THE INVENTION

In consideration of the above facts, an object of the invention is to obtain a formed article for a vehicle body structural member with which it is possible to prevent or effectively suppress the occurrence of residual stress after forming, and to improve the dimensional accuracy.

A formed article for a vehicle body structural member according to a first aspect of the invention is a formed article for a vehicle body structural member in which a pair of leg wall portions are extended to one side of thickness direction of the top wall portion from respective edge portions with respect to width direction of a top wall portion. The formed article for a vehicle body structural member includes: a first gradually varying portion that is provided in the top wall portion between two end portions with respect to the longitudinal direction of the top wall portion and is continuously extended from one end side to the other end side in the longitudinal direction of the top wall portion so that the first gradually varying portion is curved around an axis extending in the width direction of the top wall portion and so that width of the top wall portion varies; and a second gradually varying portion that is provided in at least one of the pair of leg wall portions according to a location in which the first gradually varying portion is provided in the top wall portion, and is continuously extended from one end side to the other end side in the longitudinal direction of the top wall portion, wherein width of the leg wall portion varies so that the variation in the width of the top wall portion in the first gradually varying portion is canceled. In addition, the shape of a gradually-varying-portion ridge that is a boundary between the first gradually varying portion and the second gradually varying portion is made substantially the same both in a plan view that is viewed along the thickness direction of the top wall portion and in a side view that is viewed along the width direction of the top wall portion.

In the formed article for a vehicle body structural member according to the first aspect, the leg wall portions are extended to one side of thickness direction of the top wall portion from respective edge portions with respect to width direction of a top wall portion, so that the formed article for a vehicle body structural member is formed to have a substantially U-shaped cross section as a whole. In addition, the top wall portion is curved around an axis extending in the width direction of the top wall portion in the portion in which the first gradually varying portion is provided in the top wall portion, so that in the formed article for a vehicle body structural member, the height of the cross section, that is, the height of the cross section taken along the plane perpendicular to the longitudinal direction of the top wall portion varies.

In the formed article for a vehicle body structural member according to the first aspect, in the first gradually varying portion, not only the top wall portion is curved around an axis extending in the width direction of the top wall portion, but also the width of the top wall portion varies according to the curve. In addition, in the second gradually varying portion of the leg wall portion corresponding to the first gradually varying portion, the width of the leg wall portion varies so as to cancel the increase and decrease in the width of the top wall portion in the first gradually varying portion. In addition, the shape of the gradually-varying-portion ridge that is the boundary between the first and second gradually varying portions is substantially the same both in a plan view that is viewed along the thickness direction of the top wall portion and in a side view that is viewed along the width direction of the top wall portion.

With this configuration, in the formed article for a vehicle body structural member according to the first embodiment, variation in the sum of the dimension of the top wall portion in the width direction thereof and the heights of the two leg wall portions depending on the positions along the longitudinal direction of the top wall portion is very small, and therefore, even when the height of the cross section varies, the residual stress that occurs after forming is eliminated or such residual stress is effectively reduced. As a result, it is possible to effectively improve the dimensional accuracy.

In the formed article for a vehicle body structural member according to the first aspect, on the side of a predetermined position in the longitudinal direction of the top wall portion on which side the width of the top wall portion is greater than that on the other side, the first gradually varying portion may be curved around an axis extending in the width direction of the top wall portion, wherein the center of curvature of the first gradually varying portion is located on one side with respect to the thickness direction, of the top wall portion, and on the side of the predetermined position in the longitudinal direction of the top wall portion on which side the width of the top wall portion is less than that on the other side, the first gradually varying portion may be curved around an axis extending in the width direction of the top wall portion, wherein the center of curvature of the first gradually varying portion is located on the other side with respect to the thickness direction, of the top wall portion.

The formed article for a vehicle body structural member according to the first aspect may further include a flange portion extended from an edge portion of the leg wall portion on the side opposite to the top wall portion side, wherein: at least part of the second gradually varying portion may be curved around an axis extending in the width direction of the leg wall portion, and the curvature of the second gradually varying portion on the top wall portion side and the curvature of the second gradually varying portion on the flange portion side may be made substantially equal to each other in a portion in which the second gradually varying portion is curved.

In the formed article for a vehicle body structural member according to the first aspect, a flange portion is extended from the edge portion of the leg wall portion on the side opposite to the top wall portion side, so that the formed article for a vehicle body structural member according to the first aspect has a substantially hat-shaped cross section. In addition, at least part of the second gradually varying portion is curved around an axis extending in a width direction of the leg wall portion. In the formed article for a vehicle body structural member according to the invention, the curvature of the second gradually varying portion on the top wall portion side and the curvature thereof on the flange portion side are substantially equal to each other in a portion in which the second gradually varying portion is curved. Thus, even when the second gradually varying portion (leg wall portion) is curved as described above, no wrinkle occurs or the occurrence of wrinkles is effectively suppressed.

In a formed article for a vehicle body structural member according to a second aspect of the invention, a pair of leg wall portions are extended to one side of thickness direction of the top wall portion from respective edge portions with respect to width direction of a top wall portion, and a flange portion is extended outward in the width direction of the top wall portion from an edge portion on the side opposite to the top wall portion side of at least one of the pair of leg wall portions. The formed article for a vehicle body structural member includes: a first gradually varying portion that is provided in a gradually-varying-portion forming wall that is at least one of the top wall portion and the flange portion between two end portions, with respect to the longitudinal direction of the gradually-varying-portion forming wall and is continuously extended from one end side to the other end side in the longitudinal direction of the gradually-varying-portion forming wall so that an edge portion on the leg wall portion side with respect to the width direction of the first gradually varying portion is curved around an axis extending in the width direction of the gradually-varying-portion forming wall, which causes width of the gradually-varying-portion forming wall to vary; and a second gradually varying portion that is provided in at least one of the pair of leg wall portions according to a location in which the first gradually varying portion is provided in the gradually-varying-portion forming wall, and that is continuously extended from one end side to the other end side in the longitudinal direction of the gradually-varying-portion forming wall, wherein width of the leg wall portion varies so that the variation in the width of the gradually-varying-portion forming wall in the first gradually varying portion is canceled. In addition, the shape of a gradually-varying-portion ridge that is the boundary between the first gradually varying portion and the second gradually varying portion is made substantially the same both in a plan view that is viewed along the thickness direction of the top wall portion and in a side view that is viewed along the width direction of the top wall portion.

In the formed article for a vehicle body structural member according to the second aspect, the leg wall portions are extended to one side of sickness portion of the wall portion from respective edge portions with respect to width direction of the top wall portion. In addition, the flange portion is extended outward in the width direction of the top wall portion from the edge portion on the side opposite to the top wall portion side of the leg wall portion. Thus, the formed article for a vehicle body structural member according to the invention is formed to have a substantially U-shaped cross section (more specifically, a substantially hat-shaped cross section when the flange portions are extended from the two leg wall portions, or a substantially cap-shaped cross section when the flange portion is extended from one leg wall portion) that is open toward one side in the thickness direction of the top wall portion as a whole.

In the formed article for a vehicle body structural member according to the second aspect, the first gradually varying portion is provided in the gradually-varying-portion forming wall that is at least one of the top wall portion and the flange portion (in other words, one of the top wall portion and the flange portion, in which the first gradually varying portion is provided, is defined as the gradually-varying-portion forming wall). In addition, the gradually-varying-portion forming wall is curved around an axis extending in the width direction of the gradually-varying-portion forming wall in the portion in which the first gradually varying portion is provided in the gradually-varying-portion forming wall, so that in the formed article for a vehicle body structural member, the height of the cross section, that is, the height of the cross section taken along the plane perpendicular to the longitudinal direction of the top wall portion.

In the formed article for a vehicle body structural member according to the second aspect, in the first gradually varying portion, not only the gradually-varying-portion forming wall is curved around an axis extending in the width direction of the gradually-varying-portion forming wall, but also the width of the gradually-varying-portion forming wall varies according to the curve. In addition, in the second gradually varying portion of the leg wall portion corresponding to the first gradually varying portion, the width of the leg wall portion varies so as to cancel the increase and decrease in the width of the gradually-varying-portion forming wall in the first gradually varying portion. In addition, the shape of the gradually-varying-portion ridge that is the boundary between the first and second gradually varying portions is substantially the same both in a plan view that is viewed along the thickness direction of the top wall portion and in a side view that is viewed along the width direction of the top wall portion.

With this configuration, in the formed article for a vehicle body structural member according to the second aspect, variation in the sum of the dimension of the gradually-varying-portion forming wall in the width direction thereof and the heights of the two leg wall portions depending on the positions along the longitudinal direction of the gradually-varying-portion forming wall is very small, and therefore, even when the height of the cross section varies, no residual stress occurs after forming or such residual stress is effectively reduced. As a result, it is possible to effectively improve the dimensional accuracy.

With regard to the above aspects, although, in the first aspect, there is no limitation concerning the presence of the flange portion that is a component of the second aspect, the first gradually varying portion is provided in the top wall portion. On the other hand, in the second aspect, although it is necessary to have the flange portion, the first gradually varying portion may be provided in either of the top wall portion and the flange portion, or the first gradually varying portion may be provided in each of the top wall portion and the flange portion. Thus, in the second aspect, the top wall portion is defined as the gradually-varying-portion forming wall when the first gradually varying portion is provided in the top wall portion, and the flange portion is defined as the gradually-varying-portion forming wall when the first gradually varying portion is provided in the flange portion. When the first gradually varying portion is provided in each of the top wall portion and the flange portion, both of the top wall portion and the flange portion are defined as the gradually-varying-portion forming walls.

In the formed article for a vehicle body structural member according to the second aspect, on the side of a predetermined position in the longitudinal direction of the gradually-varying-portion forming wall on which side the width of the gradually-varying-portion forming wall is greater than that on the other side, the first gradually varying portion may be curved around an axis extending in the width direction of the gradually-varying-portion forming wall, wherein the center of curvature of the first gradually varying portion is located on one side with respect to the thickness direction of the gradually-varying-portion forming wall, and, on the side of the predetermined position in the longitudinal direction of the gradually-varying-portion forming wall on which side the width of the gradually-varying-portion forming wall is less than that on the other side, the first gradually varying portion is curved around an axis extending in the width direction of the gradually-varying-portion forming wall, wherein the center of curvature of the first gradually varying portion is located on the other side with respect to the thickness direction of the gradually-varying-portion forming wall.

In the formed article for a vehicle body structural member according to the above aspect, the second gradually varying portion may be twisted around an axis extending in the longitudinal direction of the leg wall portion according to the variation in height of cross section of and in width of the first gradually varying portion.

In the formed article for a vehicle body structural member according to the above aspect, the second gradually varying portion is twisted around an axis extending in the longitudinal direction of the leg wall portion according to the variation in height of cross section of and in width of the first gradually varying portion. When the second gradually-varying portion is twisted in this way, it is possible to eliminate or effectively reduce variation in the sum of the dimension of the top wall portion in the width direction and the heights of the two leg wall portions. As a result, it is possible to eliminate or effectively reduce the occurrence of residual stress after forming, and it is possible to effectively improve the dimensional accuracy.

In the formed article for a vehicle body structural member according to the above aspects, the first gradually varying portion and the second gradually varying portion corresponding to the first gradually varying portion may be gently curved.

In the formed article for a vehicle body structural member according to the above aspects, the first gradually varying portion may be formed substantially symmetrically with respect to the center with respect to the width direction of the top wall portion.

In the formed article for a vehicle body structural member according to the above aspects, in the second gradually varying portion, the pair of leg wall portions may be formed substantially symmetrically.

In the formed article for a vehicle body structural member according to the above aspects, the first gradually varying portion and the second gradually varying portion may be each formed in a plate shape.

In the formed article for a vehicle body structural member according to the above aspects, the formed article for a vehicle body structural member may be formed by drawing.

In the formed article for a vehicle body structural member according to the above aspects, the formed article for a vehicle body structural member may be made of a super high tensile steel plate.

In the formed article for a vehicle body structural member according to the above aspects, the formed article for a vehicle body structural member may be used in a center pillar upper reinforcement provided along a center pillar of a vehicle body.

In the formed article for a vehicle body structural member according to the above aspects, the formed article for a vehicle body structural member may be used in a center pillar lower reinforcement provided along a center pillar of a vehicle body.

In the formed article for a vehicle body structural member according to the above aspects, the formed article for a vehicle body structural member may be used in a roof side rail outer reinforcement provided along a roof side of a vehicle body.

As described above, with the formed articles for a vehicle body structural member according to the above aspects, the residual stress that occurs after forming is eliminated or effectively reduced, and it is possible to effectively improve the dimensional accuracy after forming.

With the formed article for a vehicle body structural member according to the aspect in which the flange portion is provided, it is possible to prevent or remarkably effectively suppress the occurrence of wrinkles in the flange portion even when the second gradually-varying portion (leg wall portion) is curved.

With the formed article for a vehicle body structural member according to the above aspect, it is possible to eliminate or effectively reduce variation in the sum of the dimension of the top wall portion in the width direction and the heights of the two leg wall portions depending on the positions along the longitudinal direction of the top wall portion. Thus, it is possible to effectively improve the dimensional accuracy.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF EMBODIMENTS

Figure 1:
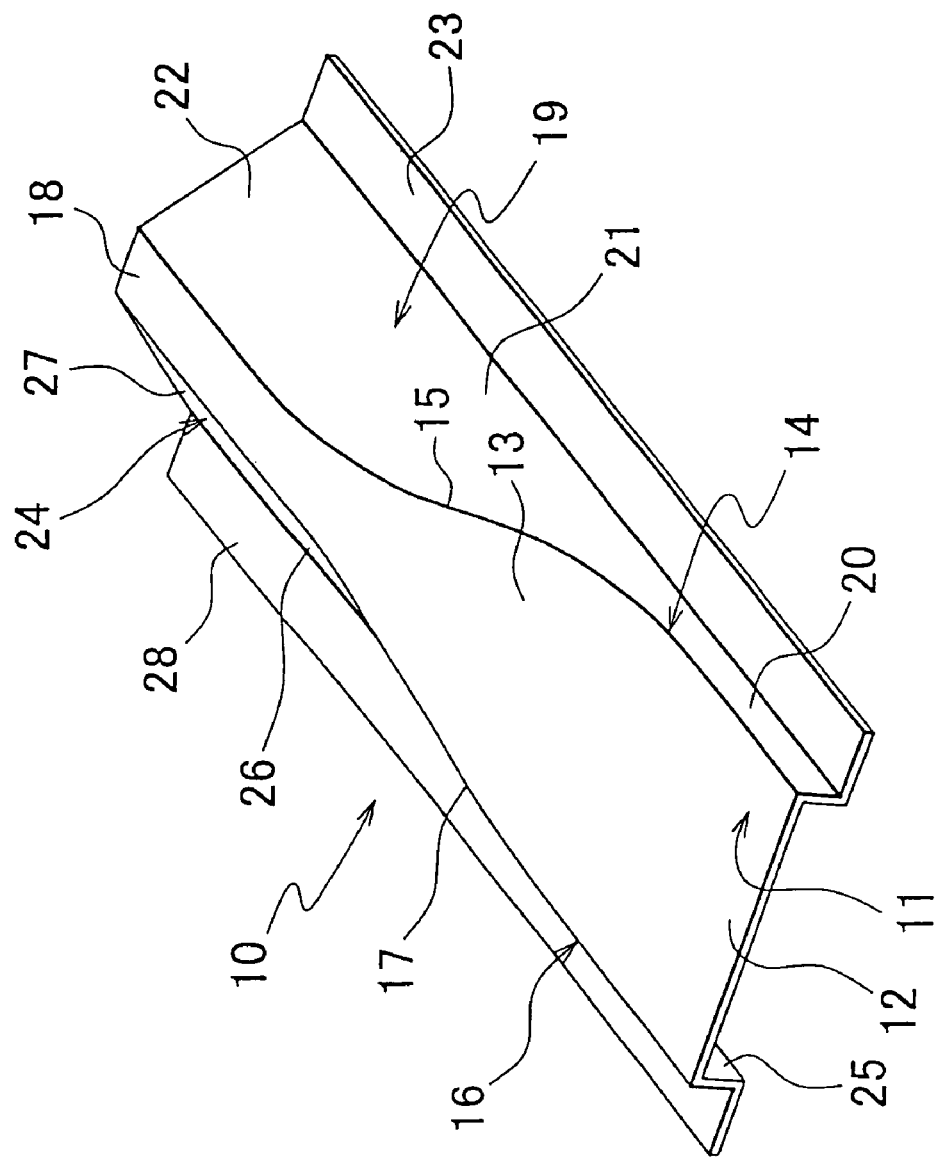
FIG. 1 is a perspective view schematically showing a configuration of a formed article for a vehicle body structural member according to a first embodiment of the invention.
Figure 2:
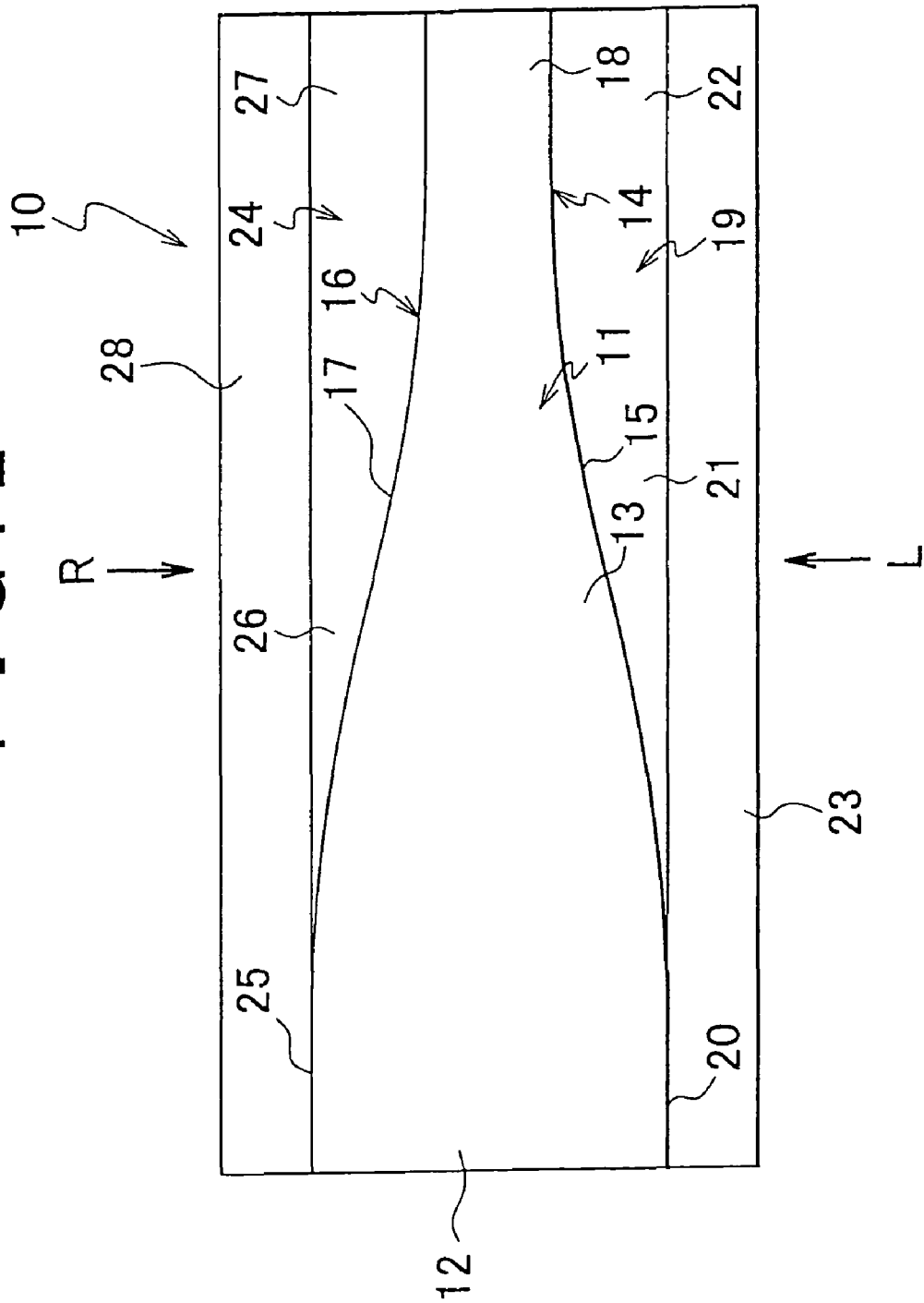
FIG. 2 is a plan view schematically showing the configuration of the formed article for a vehicle body structural member according to the first embodiment of the invention.
Figure 3:
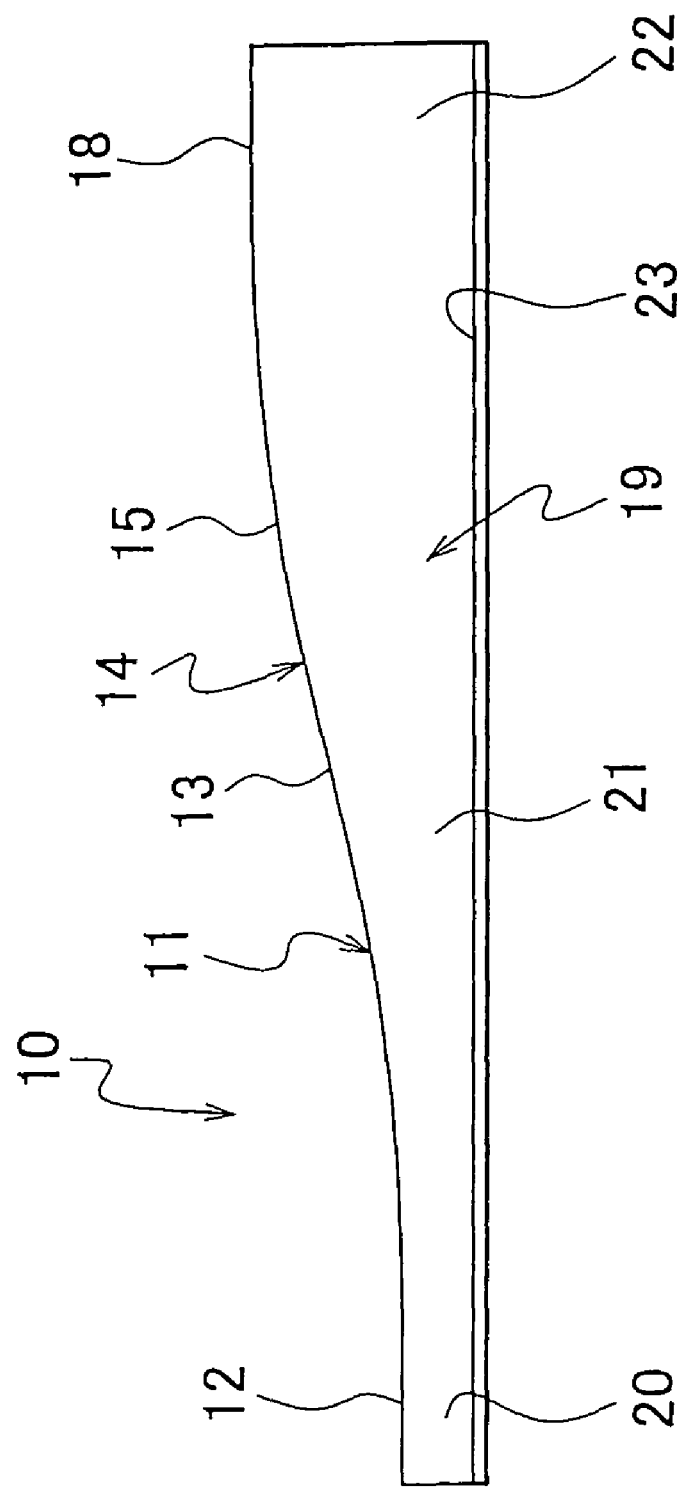
FIG. 3 is a side view in which the configuration of the formed article for a vehicle body structural member according to the first embodiment of the invention is viewed from the direction indicated by arrow L in FIG. 2.
Figure 4:
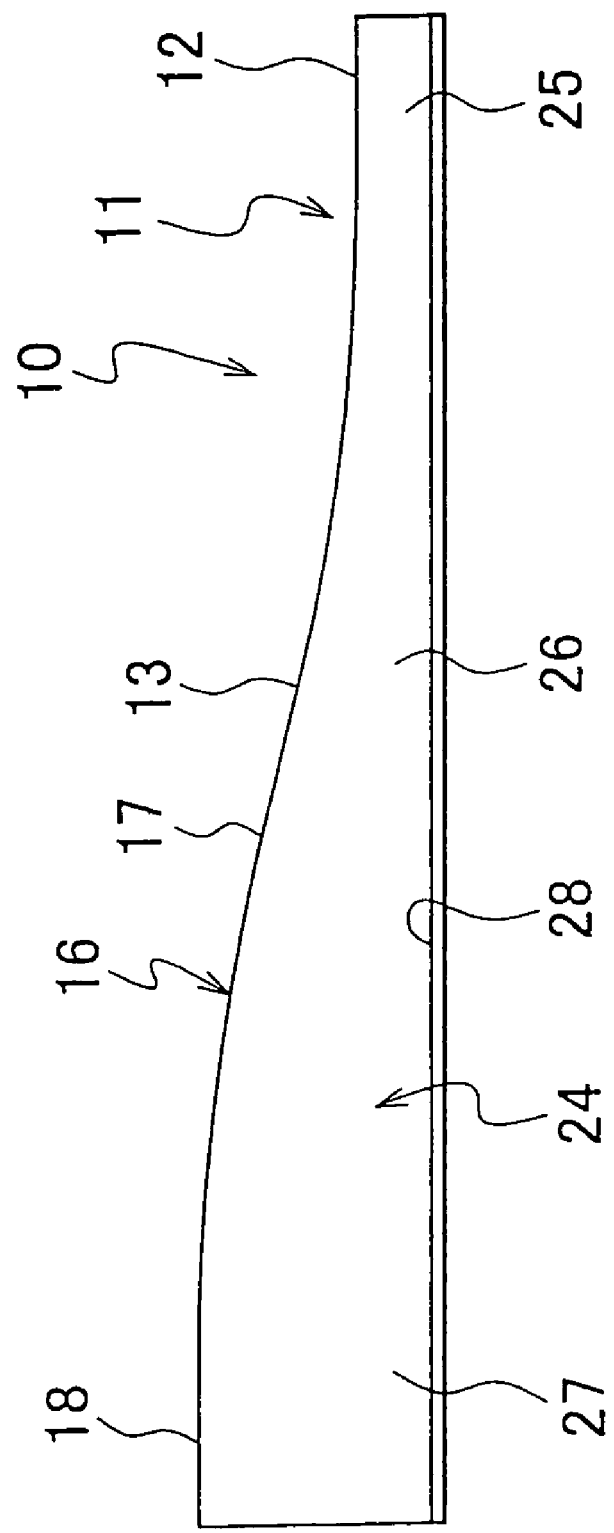
FIG. 4 is a side view in which the configuration of the formed article for a vehicle body structural member according to the first embodiment of the invention is viewed from the direction indicated by arrow R in FIG. 2.

FIG. 1 shows, in a perspective view, a configuration of a formed article 10 for a vehicle body structural member according to a first embodiment of the invention. FIG. 2 shows a plan view of the formed article 10 for a vehicle body structural member. FIG. 3 shows a side view of the formed article 10 for a vehicle body structural member when viewed from the arrow L side in FIG. 2. FIG. 4 shows a side view of the formed article 10 for a vehicle body structural member when viewed from the arrow R side in FIG. 2, that is, from the opposite side as compared to the case of FIG. 3.

As shown in these figures, the formed article 10 for a vehicle body structural member includes a top wall portion 11, which may be regarded as a gradually-varying-portion forming wall. The top wall portion 11 includes a lower flat portion 12, which is flat-shaped. A top-wall gradually-varying portion 13, which may be regarded as a first gradually varying portion, is continuously extended from one end, with respect to the longitudinal direction of the top wall portion 11, of the lower flat portion 12. The top-wall gradually-varying portion 13 is formed in a plate shape. The top-wall gradually-varying portion 13 is curved around an axis extending in the width direction of the top wall portion 11, in which the center of curvature is located on one side, with respect to the thickness direction, of the top-wall gradually-varying portion 13 on the lower flat portion 12 side of a predetermined position in the central portion with respect to the longitudinal direction of the top-wall gradually-varying portion 13. Thus, the top-wall gradually-varying portion 13 is shifted to one side, with respect to the thickness direction, of the lower flat portion 12 at the predetermined position. In addition, the thickness direction of the top-wall gradually-varying portion 13 is inclined, relative to the thickness direction of the lower flat portion 12, around an axis extending in the width direction of the top wall portion 11.

On the other hand, on the side opposite to the lower flat portion 12 side relative to the above-mentioned predetermined position, the top-wall gradually-varying portion 13 is curved around an axis extending in the width direction of the top wall portion 11, in which the center of curvature is located on the other side, with respect to the thickness direction, of the top-wall gradually-varying portion 13. Thus, although the end portion, opposite to the lower flat portion 12 side, of the top-wall gradually-varying portion 13 is further shifted to the one side of the predetermined position with respect to the thickness direction, at this end portion, the angle at which the thickness direction of the top-wall gradually-varying portion 13 is inclined relative to the thickness direction of the lower flat portion 12 is less than such an inclination angle at the predetermined position. In a ridge portion 14 that is an edge portion on one side of the top wall portion 11 with respect to the width direction, a gradually-varying-portion side ridge 15 that is a portion corresponding to the top-wall gradually-varying portion 13 is curved around the center of curvature located on the inner side, with respect to the width direction, of the top-wall gradually-varying portion 13 from the end portion on the lower flat portion 12 side to the above-mentioned predetermined position, and is curved around the center of curvature located on the outer side, with respect to the width direction, of the top-wall gradually-varying portion 13 from the above-mentioned predetermined position to the end portion on the side opposite to the lower flat portion 12 side.

In a ridge portion 16 that is an edge portion on the other side of the top wall portion 11 with respect to the width direction, a gradually-varying-portion side ridge 17 that is a portion corresponding to the top-wall gradually-varying portion 13 is curved around the center of curvature located on the inner side, with respect to the width direction, of the top-wall gradually-varying portion 13 from the end portion on the lower flat portion 12 side to the above-mentioned predetermined position, and is curved around the center of curvature located on the outer side, with respect to the width direction, of the top-wall gradually-varying portion 13 from the above-mentioned predetermined position to the end portion on the side opposite to the lower flat portion 12 side. Because both sides, with respect to the width direction, of the top-wall gradually-varying portion 13, that is, the ridge portions 14 and 16, are curved in this way, the width of the top-wall gradually-varying portion 13 is gradually reduced toward the side opposite to the lower flat portion 12 side. An upper flat portion 18 is continuously extended from the end portion, opposite to the lower flat portion 12 side, of the top-wall gradually-varying portion 13 with such a configuration. Because the width of the top-wall gradually-varying portion 13 is gradually reduced toward the side opposite to the lower flat portion 12 side as described above, the upper flat portion 18 is formed in a plate shape with a width less than the width of the lower flat portion 12.

A leg wall portion 19 is continuously extended from the edge portion, on one side with respect to the width direction, of the top wall portion 11 with the above-described configuration. The leg wall portion 19 includes a corresponding flat portion 20 that is in a plate shape and corresponding to the above-described lower flat portion 12. A leg-wall gradually-varying portion 21, which may be regarded as a second gradually varying portion, corresponding to the top-wall gradually-varying portion 13, is continuously extended from one end, with respect to the longitudinal direction of the top wall portion 11, of the corresponding flat portion 20. The above-described ridge portion 14, which is the edge portion, on one side in the width direction, of the top wall portion 11, is also the edge portion, on the top wall portion 11 side, of the leg wall portion 19. Thus, the gradually-varying-portion side ridge 15 that is a portion, corresponding to the top-wall gradually-varying portion 13, of the ridge portion 14 is also an edge portion, on the top wall portion 11 side, of the leg-wall gradually-varying portion 21.

When the gradually-varying-portion side ridge 15 is regarded as the edge portion, on the top-wall gradually-varying portion 13 side, of the leg-wall gradually-varying portion 21, the gradually-varying-portion side ridge 15 is curved around the center of curvature located on the outer side, with respect to the width direction of the leg-wall gradually-varying portion 21, of the gradually-varying-portion side ridge 15 on the top-wall gradually-varying portion 13 side from the end portion on the corresponding flat portion 20 side to the above-described predetermined position. Meanwhile, the gradually-varying-portion side ridge 15 is curved around the center of curvature located on the side opposite to the top-wall gradually-varying portion 13 side, with respect to the gradually-varying-portion side ridge 15, in the width direction of the leg-wall gradually-varying portion 21 from the above-mentioned predetermined position to the end portion on the side opposite to the corresponding flat portion 20 side.

Thus, the edge portion of the leg-wall gradually-varying portion 21 on the top-wall gradually-varying portion 13 side follows the curve of the top-wall gradually-varying portion 13. In addition, the leg-wall gradually-varying portion 21 is twisted around an axis extending in the longitudinal direction of the leg wall portion 19. Thus, the leg-wall gradually-varying portion 21 is inclined so that, as compared to the thickness direction of the leg-wall gradually-varying portion 21 on the corresponding flat portion 20 side, the thickness direction of the leg-wall gradually-varying portion 21 becomes closer to the thickness direction of the lower flat portion 12 on the side opposite to the corresponding flat portion 20 side.

A corresponding flat portion 22 corresponding to the upper flat portion 18 is continuously extended from the end portion, on the side opposite to the corresponding flat portion 20 side, of the above-described leg-wall gradually-varying portion 21. The corresponding flat portion 22 is formed in a plate shape so that the thickness direction of the corresponding flat portion 22 coincides with the thickness direction of the leg-wall gradually-varying portion 21 at the end portion, on the corresponding flat portion 22 side, of the leg-wall gradually-varying portion 21. A flat flange portion 23 is extended from the edge portion, on the side opposite to the top wall portion 11 side, of the leg wall portion 19 with the above-described configuration outward in the width direction of the lower flat portion 12.

A leg wall portion 24 is continuously extended from the edge portion, on the other side with respect to the width direction, of the top wall portion 11. The leg wall portion 24 includes a corresponding flat portion 25 that is flat-shaped and corresponding to the above-described lower flat portion 12. A leg-wall gradually-varying portion 26, which may be regarded as a second gradually varying portion, corresponding to the top-wall gradually-varying portion 13, is continuously extended from one end, with respect to the longitudinal direction of the top wall portion 11, of the corresponding flat portion 25. The above-described ridge portion 16, which is the edge portion, on the other side with respect to the width direction, of the top wall portion 11, is also the edge portion, on the top wall portion 11 side, of the leg wall portion 24. Thus, the gradually-varying-portion side ridge 17, which is the portion of the ridge portion 16 corresponding to the top-wall gradually-varying portion 13, is also an edge portion, on the top wall portion 11 side, of the leg-wall gradually-varying portion 26.

When the gradually-varying-portion side ridge 17 is regarded as the edge portion, on the top-wall gradually-varying portion 13 side, of the leg-wall gradually-varying portion 26, the gradually-varying-portion side ridge 17 is curved around the center of curvature located on the outer side, with respect to the width direction of the leg-wall gradually-varying portion 26, of the gradually-varying-portion side ridge 17 on the top-wall gradually-varying portion 13 side from the end portion on the corresponding flat portion 20 side to the above-described predetermined position. Meanwhile, the gradually-varying-portion side ridge 17 is curved around the center of curvature located on the side opposite to the top-wall gradually-varying portion 13 side with respect to the gradually-varying-portion side ridge 17, in the width direction of the leg-wall gradually-varying portion 26 from the above-mentioned predetermined position to the end portion on the side opposite to the corresponding flat portion 25 side. Thus, the edge portion of the leg-wall gradually-varying portion 26 on the top-wall gradually-varying portion 13 side follows the curve of the top-wall gradually-varying portion 13. In addition, the leg-wall gradually-varying portion 26 is twisted around an axis extending in the longitudinal direction of the leg wall portion 24. Thus, the leg-wall gradually-varying portion 26 is inclined so that, as compared to the thickness direction of the leg-wall gradually-varying portion 26 on the corresponding flat portion 25 side, the thickness direction of the leg-wall gradually-varying portion 26 becomes closer to the thickness direction of the lower flat portion 12 on the side opposite to the lower flat portion 25 side.

A corresponding flat portion 27 corresponding to the upper flat portion 18 is continuously extended from the end portion of the above-described leg-wall gradually-varying portion 26 on the side opposite to the corresponding flat portion 25 side. The corresponding flat portion 27 is formed in a plate shape so that the thickness direction of the corresponding flat portion 27 coincides with the thickness direction of the leg-wall gradually-varying portion 26 at the end portion thereof on the corresponding flat portion 27 side. A flat flange portion 28 is extended from the edge portion, on the side opposite to the top wall portion 11 side, of the leg wall portion 24 with the above-described configuration outward in the width direction of the lower flat portion 12. Thus, the cross section of the formed article 10 for a vehicle body structural member has a substantially symmetrical hat shape, which is open in the direction from the top wall portion 11 side to the flange portions 23 and 28 side.

In the formed article 10 for a vehicle body structural member with the above-described configuration, the height of the cross section of the formed article 10 for a vehicle body structural member varies in the portion corresponding to the top-wall gradually-varying portion 13. The formed article 10 for a vehicle body structural, member is configured so that the shape of the ridge portion 14 in a plan view, illustrated in FIG. 2, and the shape of the ridge portion 14 in a side view, illustrated in FIG. 3, substantially match. In order to achieve this, variation of the inclination angle of the width direction of the leg-wall gradually-varying portion 21, that is, the manner in which the leg-wall gradually-varying portion 21 is twisted around an axis extending in the longitudinal direction of the leg wall portion 19 is set.

The formed article 10 for a vehicle body structural member is also configured so that the shape of the ridge portion 16 in a plan view, illustrated in FIG. 2, and the shape of the ridge portion 16 in a side view, illustrated in FIG. 4, substantially match. In order to achieve this, variation of the inclination angle of the width direction of the leg-wall gradually-varying portion 26, that is, the manner in which the leg-wall gradually-varying portion 26 is twisted around an axis extending in the longitudinal direction of the leg wall portion 24 is set. When the formed article 10 for a vehicle body structural member is configured as described above, in the formed article 10 for a vehicle body structural member, the width of the leg-wall gradually-varying portion 21 and the width of the leg-wall gradually-varying portion 26 gradually increase according to the increase in the height of the cross section of the formed article 10 for a vehicle body structural member from the lower flat portion 12 side toward the upper flat portion 18 side. In addition, in the formed article 10 for a vehicle body structural member, the sum of the increments of the widths of the leg-wall gradually-varying portions 21 and 26 is substantially equal to the decrement of the width of the top-wall gradually-varying portion 13.

By drawing (pressing) a plate, the formed article 10 for a vehicle body structural member with the above-described configuration is formed so as to have a hat-shaped cross section in which the height of the cross section of the formed article 10 for a vehicle body structural member varies in the portion corresponding to the top-wall gradually-varying portion 13. Thus, the formed article 10 for a vehicle body structural member is configured so that although the height of the cross section of the formed article 10 for a vehicle body structural member varies in the portion corresponding to the top-wall gradually-varying portion 13, the shape of the ridge portion 14 in a plan view, illustrated in FIG. 2, and the shape of the ridge portion 14 in a side view, illustrated in FIG. 3, substantially match, and that the shape of the ridge portion 16 in a plan view, illustrated in FIG. 2, and the shape of the ridge portion 16 in a side view, illustrated in FIG. 4, substantially match.

In this way, the increase in the widths of the leg-wall gradually-varying portions 21 and 26 according to the increase in the height of the cross section of the top-wall gradually-varying portion 13 from the lower flat portion 12 side to the upper flat portion 18 side is canceled by the decrease in the width of the top-wall gradually-varying portion 13. Thus, the sum of the width of the leg-wall gradually-varying portion 21, the width of the top-wall gradually-varying portion 13, and the width of the leg-wall gradually-varying portion 26 is constant or hardly varies along the longitudinal direction of the top wall portion 11. Because the sum of the width of the leg-wall gradually-varying portion 21, the width of the top-wall gradually-varying portion 13, and the width of the leg-wall gradually-varying portion 26 is basically constant as described above, the residual compressive or tensile stress in the top wall portion 11 along the width direction thereof does not occur or, if any, is very small after forming the formed article 10 for a vehicle body structural member. Thus, it is possible to prevent or effectively suppress the deformation, such as elastic recovery strain, or the deterioration in the dimensional accuracy due to such residual stress.

The deformation, such as elastic recovery strain, or the deterioration in the dimensional accuracy due to residual stress becomes severe when a material with high tensile strength is used. In the formed article 10 for a vehicle body structural member, however, because it is possible to prevent or effectively suppress the deformation, such as elastic recovery strain, or the deterioration in the dimensional accuracy due to residual stress as described above, it is possible to ensure high dimensional accuracy even when a high tensile steel plate or a super high tensile steel plate is used as the material for the formed article 10 for a vehicle body structural member. Because the high tensile steel plate or the super high tensile steel plate may be used as the material for the formed article 10 for a vehicle body structural member without difficulty, it is possible to reduce the weight of the vehicle body while improving the rigidity of the vehicle body and the mechanical strength of the vehicle body.

In addition, the formed article 10 for a vehicle body structural member is designed so that the top-wall gradually-varying portion 13 and the leg-wall gradually-varying portions 21 and 26 are not bent but gradually curved to vary the height of the cross section. Thus, it is also possible to improve the rigidity of the formed article 10 for a vehicle body structural member along the longitudinal direction of the top wall portion 11.

Figure 5:
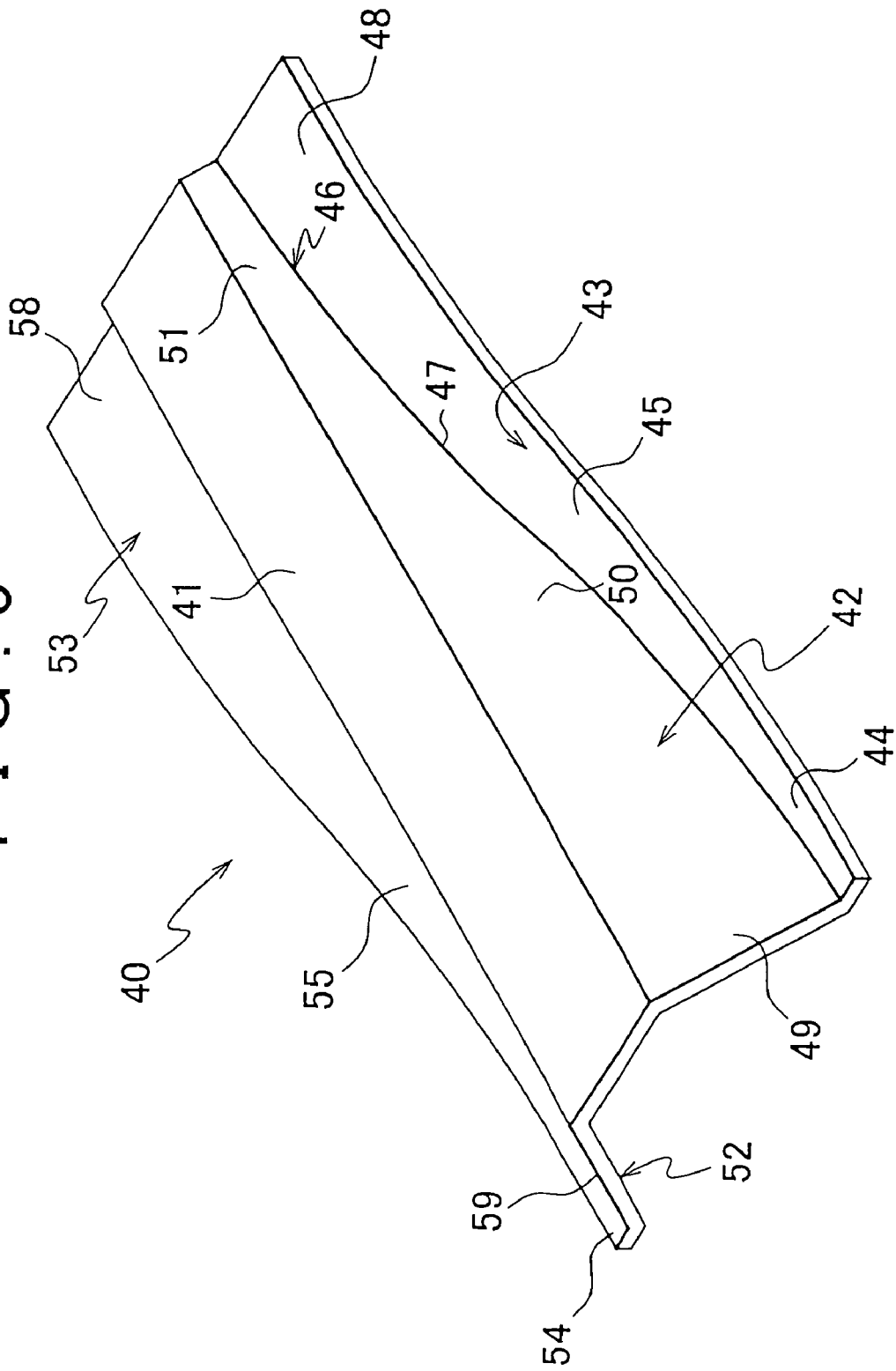
FIG. 5 is a perspective view schematically showing a configuration of a formed article for a vehicle body structural member according to a second embodiment of the invention.
Figure 6:
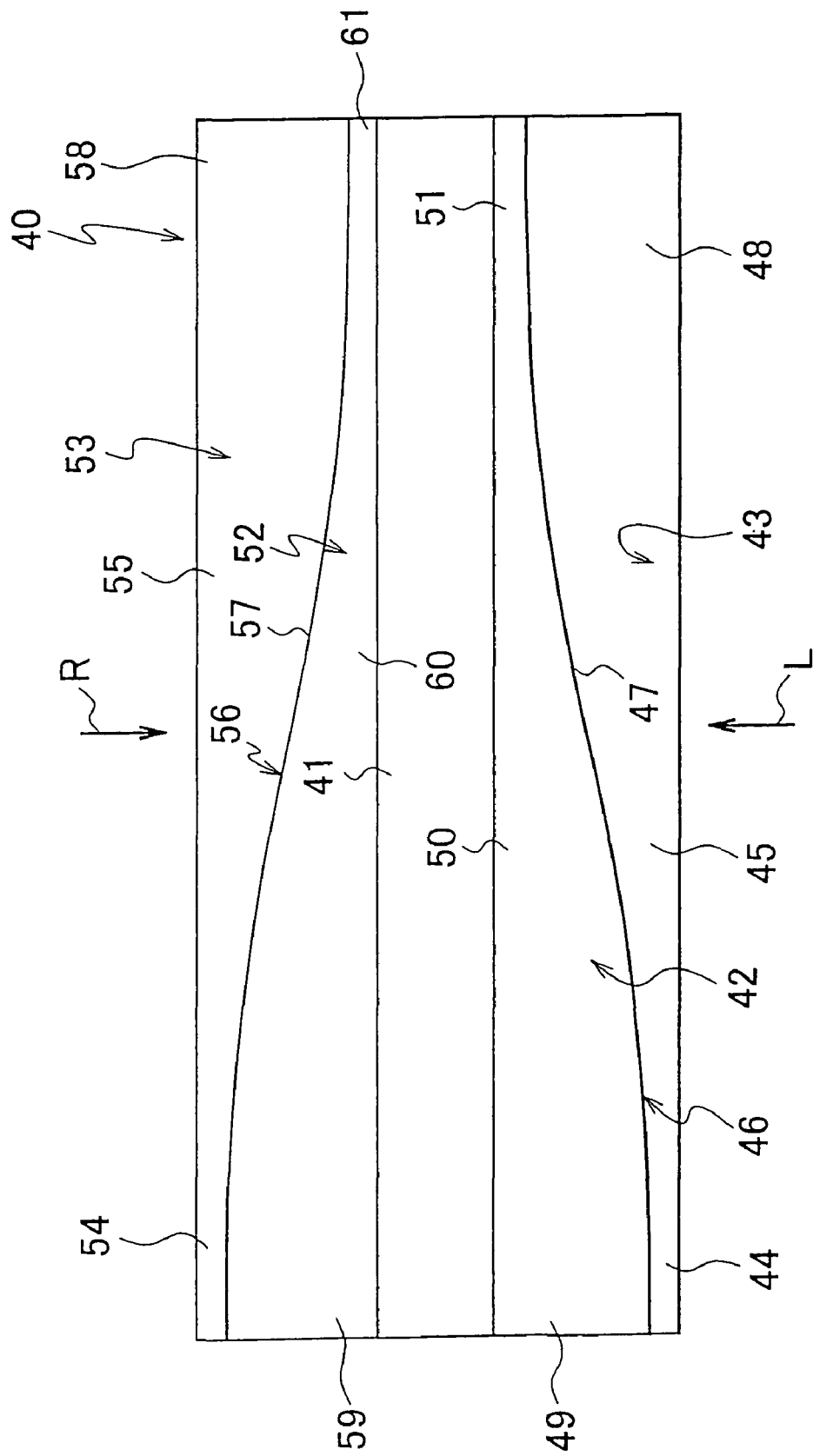
FIG. 6 is a plan view schematically showing the configuration of the formed article for a vehicle body structural member according to the second embodiment of the invention.
Figure 7:
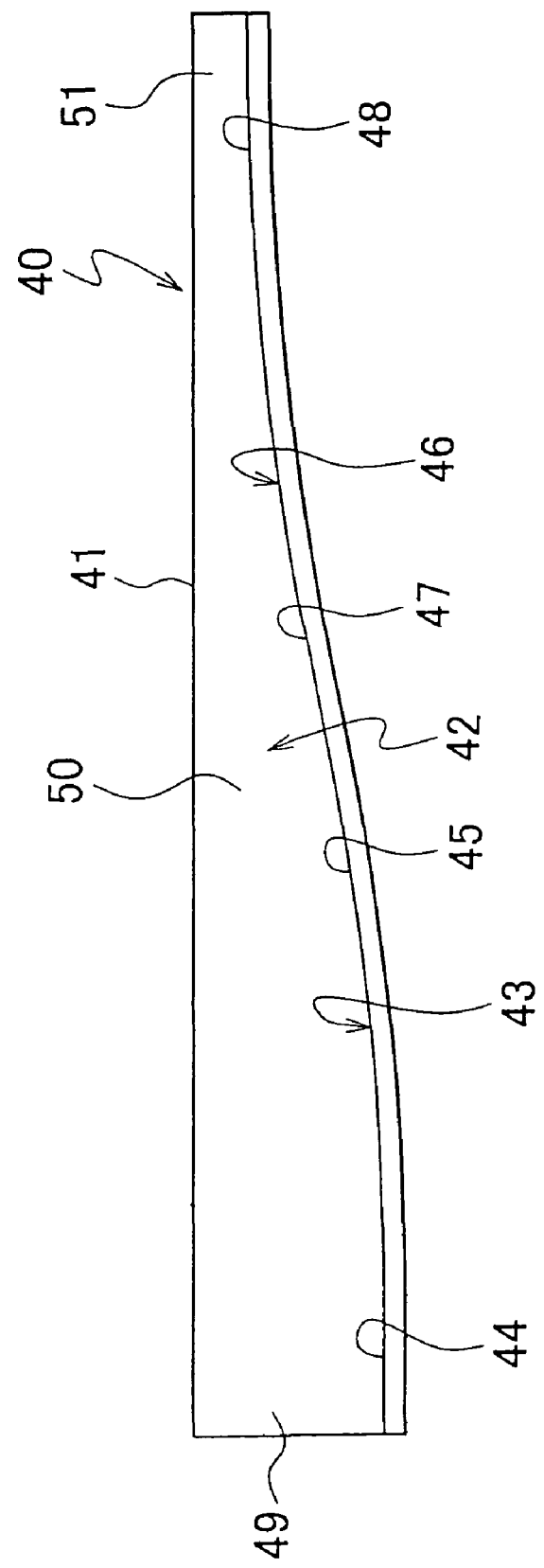
FIG. 7 is a side view in which the configuration of the formed article for a vehicle body structural member according to the second embodiment of the invention is viewed from the direction indicated by arrow L in FIG. 6.
Figure 8:
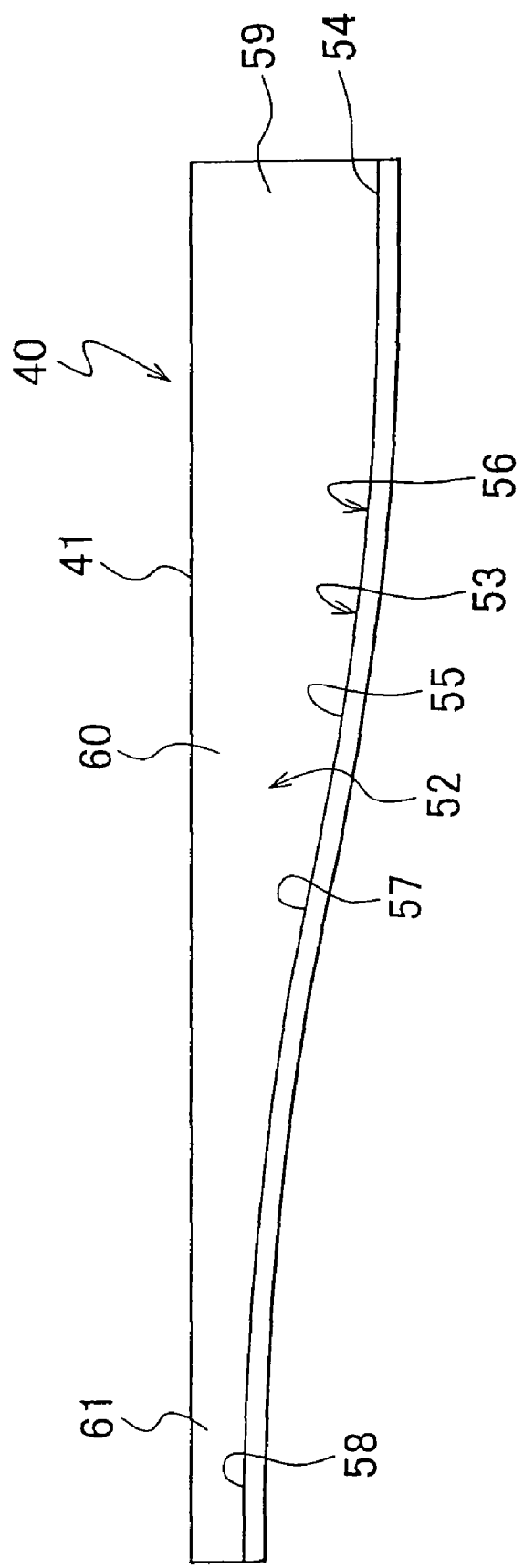
FIG. 8 is a side view in which the configuration of the formed article for a vehicle body structural member according to the second embodiment of the invention is viewed from the direction indicated by arrow R in FIG. 6.

FIG. 5 shows, in a perspective view, a configuration of a formed article 40 for a vehicle body structural member according to a second embodiment of the invention. FIG. 6 shows a plan view of the formed article 40 for a vehicle body structural member. FIG. 7 shows a side view of the formed article 40 for a vehicle body structural member when viewed from the arrow L side in FIG. 6. FIG. 8 shows a side view of the formed article 40 for a vehicle body structural member when viewed from the arrow R side in FIG. 6, that is, from the opposite side as compared to the case of FIG. 7.

As shown in these figures, the formed article 40 for a vehicle body structural member includes a top wall portion 41. A leg wall portion 42 is continuously extended from the edge portion, on one side with respect to the width direction, of the top wall portion 41. A flange portion 43, which may be regarded as the gradually-varying-portion forming wall, is extended from the edge portion, on the side opposite to the top wall portion 41 side, of the leg wall portion 42 outward in the width direction of the top wall portion 41. The flange portion 43 includes a lower flat portion 44, which is flat-shaped. A flange gradually-varying portion 45, which may be regarded as a first gradually varying portion, is continuously extended from one end, with respect to the longitudinal direction of the flange portion 43, of the lower flat portion 44.

The flange gradually-varying portion 45 is formed in a plate shape. The flange gradually-varying portion 45 is curved around an axis extending in the width direction of the flange portion 43, in which the center of curvature is located on one side, with respect to the thickness direction, of the flange gradually-varying portion 45 on the lower flat portion 44 side of a predetermined position in the central portion with respect to the longitudinal direction of the flange gradually-varying portion 45. Thus, the flange gradually-varying portion 45 is shifted to one side, with respect to the thickness direction, of the lower flat portion 44 at the predetermined position. In addition, the thickness direction of the flange gradually-varying portion 45 is inclined, relative to the thickness direction of the lower flat portion 44, around an axis extending in the width direction of the flange portion 43.

On the other hand, on the side opposite to the lower flat portion 44 side with respect to the above-mentioned predetermined position, the flange gradually-varying portion 45 is curved around an axis extending in the width direction of the flange portion 43, in which the center of curvature is located on the other side, with respect to the thickness direction, of the flange gradually-varying portion 45. Thus, although the end portion, opposite to the lower flat portion 44 side, of the flange gradually-varying portion 45 is further shifted to the one side with respect to the thickness direction, that is, to the top wall portion 41 side relative to the predetermined position, the angle at which the thickness direction of the flange gradually-varying portion 45 is inclined relative to the thickness direction of the lower flat portion 44 at the end portion, opposite to the lower flat portion 44 side, of the flange gradually-varying portion 45 is less than such an inclination angle at the predetermined position.

In a ridge portion 46 that is an edge portion, on the leg wall portion 42 side, of the flange portion 43 with respect to the width direction of the flange portion 43, a gradually-varying-portion side ridge 47 that is a portion corresponding to the flange gradually-varying portion 45 is curved around the center of curvature located on the outer side with respect to the width direction, that is, on the side closer to the center of the top wall portion 41 with respect to the width direction, from the end portion on the lower flat portion 44 side to the above-mentioned predetermined position, and is curved around the center of curvature located on the inner side with respect to the width direction from the above-mentioned predetermined position to the end portion on the side opposite to the lower flat portion 44 side. Thus, when the edge portion, opposite to the leg wall portion 42 side, of the flange portion 43 is parallel to the edge portion, on the leg wall portion 42 side, of the top wall portion 41 like the second embodiment, the width of the flange gradually-varying portion 45 gradually increases toward the side opposite to the lower flat portion 44 side.

An upper flat portion 48 is continuously extended from the side, opposite to the lower flat portion 44 side, of the flange gradually-varying portion 45 with such a configuration. Because the width of the flange gradually-varying portion 45 is gradually increased toward the side opposite to the lower flat portion 44 side as described above, the upper flat portion 48 is formed in a plate shape with a width greater than the width of the lower flat portion 44.

In addition, the leg wall portion 42 includes a corresponding flat portion 49 that is flat-shaped and corresponding to the lower flat portion 44 of the flange portion 43 with the above-described configuration. A leg-wall gradually-varying portion 50, which may be regarded as a second gradually varying portion, corresponding to the flange gradually-varying portion 45, is continuously extended from one end, with respect to the longitudinal direction of the flange portion 43, of the corresponding flat portion 49. The ridge portion 46, which is the edge portion on the leg wall portion 42 side, of the above-described flange portion 43, is also the edge portion, on the flange portion 43 side, of the leg wall portion 42. Thus, the gradually-varying-portion side ridge 47 that is a portion, corresponding to the flange gradually-varying portion 45, of the ridge portion 46 is also an edge portion, on the flange portion 43 side, of the leg-wall gradually-varying portion 50.

When the gradually-varying-portion side ridge 47 is regarded as the edge portion, on the flange gradually-varying portion 45 side, of the leg-wall gradually-varying portion 50, the gradually-varying-portion side ridge 47 is curved around the center of curvature located on the inner side, with respect to the width direction of the leg-wall gradually-varying portion 50, that is, on the top wall portion 41 side, from the end portion on the corresponding flat portion 49 side to the above-mentioned predetermined position. Meanwhile, the gradually-varying-portion side ridge 47 is curved around the center of curvature located on the outer side with respect to the width direction, that is, on the flange portion 43 side, of the leg-wall gradually-varying portion 50 from the above-mentioned predetermined position to the end portion on the side opposite to the corresponding flat portion 49 side.

Thus, the edge portion, on the flange gradually-varying portion 45 side, of the leg-wall gradually-varying portion 50 follows the curve of the flange gradually-varying portion 45. In addition, the leg-wall gradually-varying portion 50 is twisted around an axis extending in the longitudinal direction of the leg wall portion 42. Thus, the leg-wall gradually-varying portion 50 is inclined so that, as compared to the thickness direction of the leg-wall gradually-varying portion 50 on the corresponding flat portion 49 side, the thickness direction of the leg-wall gradually-varying portion 50 becomes closer to the thickness direction of the lower flat portion 44 on the side opposite to the corresponding flat portion 49 side.

A corresponding flat portion 51 corresponding to the upper flat portion 48 is continuously extended from the end portion, on the side opposite to the corresponding flat portion 49 side, of the above-described leg-wall gradually-varying portion 50. The corresponding flat portion 51 is formed in a plate shape so that the thickness direction of the corresponding flat portion 51 coincides with the thickness direction of the leg-wall gradually-varying portion 50 at the end portion thereof on the corresponding flat portion 51 side.

A leg wall portion 52 is continuously extended from the edge portion, on the other side with respect to the width direction, of the top wall portion 41, that is, the edge portion on the side opposite to the leg wall portion 42 side. A flange portion 53, which may be regarded as the gradually-varying-portion forming wall, is extended from the edge portion, on the side opposite to the top wall portion 41 side with respect to the width direction, of the leg wall portion 52 outward in the width direction of the top wall portion 41. Thus, the cross section of the formed article 40 for a vehicle body structural member according to the second embodiment has a substantially symmetrical hat shape, which is open in the direction from the top wall portion 41 side to the flange portions 43 and 53 side.

The flange portion 53 includes a lower flat portion 54, which is flat-shaped. A flange gradually-varying portion 55, which may be regarded as a first gradually varying portion, is continuously extended from one end of the lower flat portion 54 with respect to the longitudinal direction of the flange portion 53. The flange gradually-varying portion 55 is formed in a plate shape. The flange gradually-varying portion 55 is curved around an axis extending in the width direction of the flange portion 53, in which the center of curvature is located on one side, with respect to the thickness direction, of the flange gradually-varying portion 55 on the lower flat portion 54 side of a predetermined position in the central portion with respect to the longitudinal direction of the flange gradually-varying portion 55. Thus, the flange gradually-varying portion 55 is shifted to one side, with respect to the thickness direction, of the lower flat portion 54 at the predetermined position. In addition, the thickness direction of the flange gradually-varying portion 55 is inclined, relative to the thickness direction of the lower flat portion 54, around an axis extending in the width direction of the flange portion 53.

On the other hand, on the side opposite to the lower flat portion 54 side relative to the above-mentioned predetermined position, the flange gradually-varying portion 55 is curved around an axis extending in the width direction of the flange portion 53, in which the center of curvature is located on the other side, with respect to the thickness direction, of the flange gradually-varying portion 55. Thus, although the end portion, opposite to the lower flat portion 54 side, of the flange gradually-varying portion 55 is further shifted to the one side with respect to the thickness direction, that is, to the top wall portion 41 side, relative to the predetermined position, the angle at which the thickness direction of the flange gradually-varying portion 55 is inclined relative to the thickness direction of the lower flat portion 54 at the end portion, opposite to the lower flat portion 54 side, of the flange gradually-varying portion 55 is less than such an inclination angle at the predetermined position.

In a ridge portion 56 that is an edge portion, on the leg wall portion 52 side with respect to the width direction of the flange portion 53, of the flange portion 53, a gradually-varying-portion side ridge 57 that is a portion corresponding to the flange gradually-varying portion 55 is curved around the center of curvature located on the inner side with respect to the width direction, that is, on the side closer to the center of the top wall portion 41 with respect to the width direction, from the end portion on the lower flat portion 54 side to the above-mentioned predetermined position, and is curved around the center of curvature located on the outer side with respect to the width direction from the above-mentioned predetermined position to the end portion on the side opposite to the lower flat portion 54 side. Thus, when the edge portion, opposite to the leg wall portion 52 side, of the flange portion 53 is parallel to the edge portion, on the leg wall portion 52 side, of the top wall portion 41 like this embodiment, the width of the flange gradually-varying portion 55 gradually increases toward the side opposite to the lower flat portion 54 side.

An upper flat portion 58 is continuously extended from the end portion, opposite to the lower flat portion 54 side, of the flange gradually-varying portion 55 with such a configuration. Because the width of the flange gradually-varying portion 55 is gradually increased toward the side opposite to the lower flat portion 54 side as described above, the upper flat portion 58 is formed in a plate shape with a width greater than the width of the lower flat portion 54.

In addition, the leg wall portion 52 includes a corresponding flat portion 59 that is flat-shaped and corresponding to the lower flat portion 54 of the flange portion 53 with the above-described configuration. A leg-wall gradually-varying portion 60, which may be regarded as a second gradually varying portion, corresponding to the flange gradually-varying portion 55, is continuously extended from one end of the corresponding flat portion 59 with respect to the longitudinal direction of the flange portion 53. The above-described ridge portion 56, which is the edge portion, on the leg wall portion 52 side, of the flange portion 53, is also the edge portion, on the flange portion 53 side, of the leg wall portion 52. Thus, the gradually-varying-portion side ridge 57 that is a portion, corresponding to the flange gradually-varying portion 55, of the ridge portion 56 is also an edge portion, on the flange portion 53 side, of the leg-wall gradually-varying portion 60.

When the gradually-varying-portion side ridge 57 is regarded as the edge portion, on the flange gradually-varying portion 55 side, of the leg-wall gradually-varying portion 60, the gradually-varying-portion side ridge 57 is curved around the center of curvature located on the inner side, with respect to the width direction of the leg-wall gradually-varying portion 60, that is, on the top wall portion 41 side, from the end portion on the corresponding flat portion 59 side to the above-mentioned predetermined position. Meanwhile, the gradually-varying-portion side ridge 57 is curved around the center of curvature located on the outer side with respect to the width direction, that is, on the flange portion 53 side, of the leg-wall gradually-varying portion 60 from the above-mentioned predetermined position to the end portion on the side opposite to the corresponding flat portion 59 side.

Thus, the edge portion, on the flange gradually-varying portion 55 side, of the leg-wall gradually-varying portion 60 follows the curve of the flange gradually-varying portion 55. In addition, the leg-wall gradually-varying portion 60 is twisted around an axis extending in the longitudinal direction of the leg wall portion 52. Thus, the leg-wall gradually-varying portion 60 is inclined so that, as compared to the thickness direction of the leg-wall gradually-varying portion 60 on the corresponding flat portion 59 side, the thickness direction of the leg-wall gradually-varying portion 60 becomes closer to the thickness direction of the lower flat portion 54 on the side opposite to the corresponding flat portion 59 side.

A corresponding flat portion 61 corresponding to the upper flat portion 58 is continuously extended from the end portion, on the side opposite to the corresponding flat portion 59 side, of the above-described leg-wall gradually-varying portion 60. The corresponding flat portion 61 is formed in a plate shape so that the thickness direction of the corresponding flat portion 61 coincides with the thickness direction of the gradually-varying leg-wall portion 60 at the end portion thereof on the corresponding flat portion 61 side.

In the formed article 40 for a vehicle body structural member with the above-described configuration, the height of the cross section of the formed article 40 for a vehicle body structural member varies in the portion corresponding to the flange gradually-varying portions 45 and 55. The formed article 40 for a vehicle body structural member is configured so that the shape of the ridge portion 46 in a plan view, illustrated in FIG. 6, and the shape of the ridge portion 46 in a side view, illustrated in FIG. 7, substantially match. In order to achieve this, variation of the inclination angle of the width direction of the leg-wall gradually-varying portion 50, that is, the manner in which the leg-wall gradually-varying portion 50 is twisted around an axis extending in the longitudinal direction of the leg wall portion 42 is set.

The formed article 40 for a vehicle body structural member is also configured so that the shape of the ridge portion 56 in a plan view, illustrated in FIG. 6, and the shape of the ridge portion 56 in a side view, illustrated in FIG. 8, substantially match. In order to achieve this, variation of the inclination angle of the width direction of the leg-wall gradually-varying portion 60, that is, the manner in which the leg-wall gradually-varying portion 60 is twisted around an axis extending in the longitudinal direction of the leg wall portion 52 is set.

When the formed article 40 for a vehicle body structural member is configured as described above, in the formed article 40 for a vehicle body structural member, the width of the leg-wall gradually-varying portion 50 and the width of the leg-wall gradually-varying portion 60 gradually decrease according to the decrease in the height of the cross section from the lower flat portions 44 and 54 side toward the upper flat portions 48 and 58 side of the flange gradually-varying portions 45 and 55. In addition, in the formed article 40 for a vehicle body structural member, the sum of the decrements of the widths of the leg-wall gradually-varying portions 50 and 60 is substantially equal to the sum of the increments of the widths of the flange gradually-varying portions 45 and 55.

By drawing (pressing) a plate, the formed article 40 for a vehicle body structural member with the above-described configuration is formed so as to have a hat-shaped cross section such that the height of the cross section of the formed article 40 for a vehicle body structural member varies in the portion corresponding to the flange gradually-varying portions 45 and 55. Thus, the formed article 40 for a vehicle body structural member is configured so that although the height of the cross section of the formed article 40 for a vehicle body structural member varies in the portion corresponding to the flange gradually-varying portion 45 and 55, the shape of the ridge portion 46 in a plan view, illustrated in FIG. 6, and the shape of the ridge portion 46 in a side view, illustrated in FIG. 7, substantially match, and that the shape of the ridge portion 56 in a plan view, illustrated in FIG. 6, and the shape of the ridge portion 56 in a side view, illustrated in FIG. 8, substantially match.

In this way, the decrease of the widths of the leg-wall gradually-varying portions 50 and 60 corresponding to the increase in the height of the cross section of the flange gradually-varying portions 45 and 55 from the lower flat portions 44 and 54 side to the upper flat portions 48 and 58 side is canceled by the increase in the widths of the flange gradually-varying portions 45 and 55. Thus, the sum of the width of the flange gradually-varying portion 45, the width of the leg-wall gradually-varying portion 50, the width of the flange gradually-varying portion 55, and the width of the leg-wall gradually-varying portion 60 is constant or hardly varies along the longitudinal direction of the top wall portion 41. Because the sum of the width of the flange gradually-varying portion 45, the width of the flange gradually-varying portion 55, the width of the leg-wall gradually-varying portion 50, and the width of the leg-wall gradually-varying portion 60 is basically constant as described above, the residual compressive or tensile stress in the flange portions 43 and 53 along the width direction thereof does not occur or, if any, is very small after forming the formed article 40 for a vehicle body structural member. Thus, it is possible to prevent or effectively suppress the deformation, such as elastic recovery strain, or the deterioration in the dimensional accuracy due to such residual stress.

The deformation, such as elastic recovery strain, or the deterioration in the dimensional accuracy due to residual stress becomes severe when a material with high tensile strength is used. In the formed article 40 for a vehicle body structural member, however, because it is possible to prevent or effectively suppress the deformation, such as elastic recovery strain, or the deterioration in the dimensional accuracy due to residual stress as described above, it is possible to ensure high dimensional accuracy even when a high tensile steel plate or a super high tensile steel plate is used as the material for the formed article 40 for a vehicle body structural member. Because the high tensile steel plate or the super high tensile steel plate may be used as the material for the formed article 40 for a vehicle body structural member without difficulty, it is possible to reduce the weight of the vehicle body while improving the rigidity of the vehicle body and the mechanical strength of the vehicle body.

In addition, the formed article 40 for a vehicle body structural member is designed so that the flange gradually-varying portions 45 and 55 and the leg-wall gradually-varying portions 50 and 60 are not bent but gradually curved to vary the height of the cross section. Thus, it is also possible to improve the rigidity of the formed article 40 for a vehicle body structural member along the longitudinal direction of the top wall portion 41.

In the first embodiment, the top wall portion 11 is the gradually-varying-portion forming wall, and the top-wall gradually-varying portion 13 is formed in the top wall portion 11. On the other hand, in the second embodiment, the flange portions 43 and 53 are formed as the gradually-varying-portion forming wall, and the flange gradually-varying portions 45 and 55 are formed in the flange portions 43 and 53. However, there is no need to adopt a configuration in which only one of the top wall portion 11 of the first embodiment (the top wall portion 41 in the second embodiment) and the flange portions 23 and 28 of the first embodiment (the flange portions 43 and 53 in the second embodiment) is the gradually-varying-portion forming wall. Specifically, both of the top wall portion 11 (the top wall portion 41 in the second embodiment) and the flange portions 23 and 28 (the flange portions 43 and 53 in the second embodiment) may be the gradually-varying-portion forming walls, in which the first and second embodiments are appropriately combined.

Next, an example in which the invention is applied to a specific vehicle body structural member will be described on the basis of the basic configurations of the first and second embodiments and the operation and effect thereof.

Figure 9:
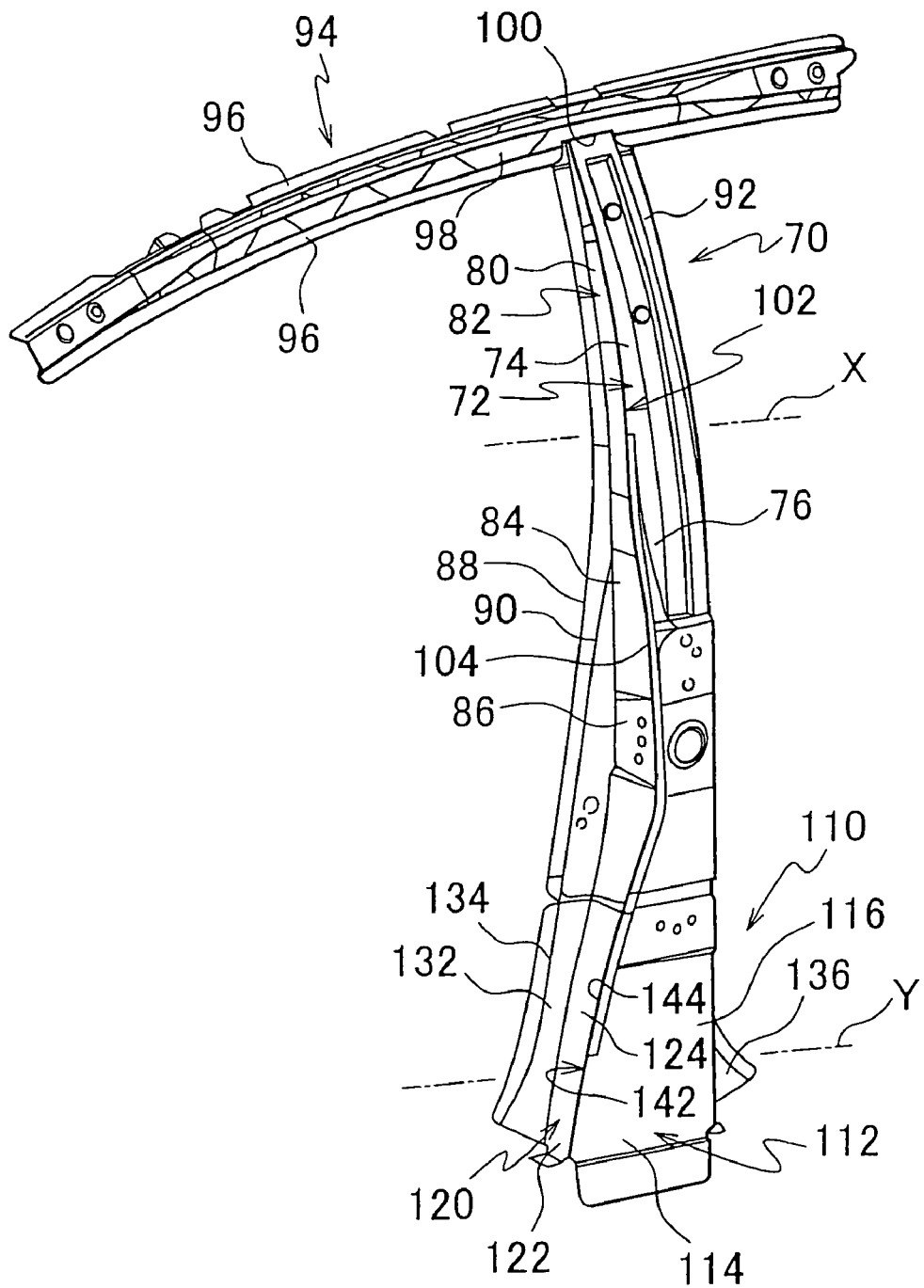
FIG. 9 is a perspective view schematically showing a configuration of a formed article for a vehicle body structural member according to a third embodiment of the invention.

FIG. 9 shows, in a perspective view, a schematic configuration of a center pillar upper reinforcement 70, which is a formed article for a vehicle body structural member and a center pillar lower reinforcement 110, which is a formed article for a vehicle body structural member, according to a third embodiment of the invention. As shown in FIG. 9, the center pillar upper reinforcement 70 includes a top wall portion 72, which may be regarded as a gradually-varying-portion forming wall, corresponding to the top wall portion 11 of the first embodiment. The top wall portion 72 includes a top wall body portion 74 corresponding to the upper flat portion 18 of the first embodiment.

The top wall body portion 74 has a plate shape of which the longitudinal direction substantially coincides with the vertical direction of the vehicle and of which the width direction substantially coincides with the longitudinal direction of the vehicle. In the top wall body portion 74, concavities and convexities in the thickness direction are appropriately formed in accordance with the design and functions required. In the top wall portion 72, the portion generally below the chain line X in FIG. 9 is a top-wall gradually-varying portion 76, which may be regarded as a first gradually varying portion, corresponding to the top-wall gradually-varying portion 13 of the first embodiment. The top-wall gradually-varying portion 76 is curved such that a predetermined portion near substantially the center thereof in the vertical direction of the vehicle is the peak and that the top-wall gradually-varying portion 76 is convex substantially inward in the lateral direction of the vehicle, and in addition, the width of the top-wall gradually-varying portion 76 along the substantially longitudinal direction of the vehicle appropriately increases and decreases according to the curve.

On the other hand, a leg wall portion 80 is extended from an edge portion, on the vehicle front side, of the top wall portion 72 outward in the substantially lateral direction of the vehicle. The leg wall portion 80 corresponds to the leg wall portion 19 of the first embodiment. The leg wall portion 80 includes a leg wall body portion 82 corresponding to the corresponding flat portion 20 of the first embodiment. A leg-wall gradually-varying portion 84, which may be regarded as a second gradually varying portion, corresponding to the top-wall gradually-varying portion 76, is extended from an end portion, substantially on the lower side with respect to the vehicle, of the leg wall body portion 82. The leg-wall gradually-varying portion 84 corresponds to the leg-wall gradually-varying portion 21 of the first embodiment. The width of the leg-wall gradually-varying portion 84 appropriately increases and decreases according to the increase and decrease in the width of the top-wall gradually-varying portion 76, and the leg-wall gradually-varying portion 84 is twisted around an axis, extending in the longitudinal direction of the leg wall portion 80, at an appropriate angle.

In addition, an intermediate portion of the leg-wall gradually-varying portion 84 in the longitudinal direction of the leg wall portion 80 is curved around an axis extending in the width direction of the leg-wall gradually-varying portion 84 so as to be open substantially toward the front side of the vehicle. A dimensional difference absorbing portion 86 is formed in the leg-wall gradually-varying portion 84 corresponding to the curved portion. In the dimensional difference absorbing portion 86, the further the portion is from the top-wall gradually-varying portion 76, the more the dimensional difference absorbing portion 86 is shifted to the rear of the vehicle relative to the other part of the leg-wall gradually-varying portion 84. Therefore, the portion of the leg-wall gradually-varying portion 84 in which the dimensional difference absorbing portion 86 is formed has a concave shape that is open substantially toward the front of the vehicle. Thus, the difference between the length of the edge portion, on the top-wall gradually-varying portion 76 side, of the leg-wall gradually-varying portion 84 and the length of the edge portion, on the side opposite to the top-wall gradually-varying portion 76 side, of the leg-wall gradually-varying portion 84 is absorbed.

A flange portion 88 is extended from the edge portion, on the side opposite to the top wall portion 72 side, of the leg wall portion 80 substantially toward the front of the vehicle. A bent portion 90 that is bent inward in the lateral direction of the vehicle is formed at a predetermined position of the flange portion 88, and thus, the flange portion 88 has a step in the lateral direction of the vehicle.

On the other hand, although not shown in FIG. 9, a leg wall portion is formed also on the side, opposite to the leg wall portion 80 side, of the top wall portion 72, that is, on the rear side thereof with respect to the vehicle, and a flange portion 92 is extended from this leg wall portion on the side thereof opposite to the top wall portion 72 side substantially toward the rear of the vehicle.

A roof side rail outer reinforcement 94 is disposed near the upper end portion of the center pillar upper reinforcement 70 with the above-described configuration. The roof side rail outer reinforcement 94, having a flange portion 96 on each side thereof with respect to the substantially vertical direction of the vehicle, is formed to have a hat-shaped cross section that is open inward with respect to the lateral direction of the vehicle. An upper end portion of the center pillar upper reinforcement 70 is fitted into the roof side rail outer reinforcement 94 through an opening 100 formed in a leg wall portion 98 and the flange portion 96 on the lower side with respect to the vehicle, and the center pillar upper reinforcement 70 is integrally joined with the roof side rail outer reinforcement 94 by fixing means, such as welding, or fastening means, such as bolts.

In addition, in the center pillar upper reinforcement 70, the edge portion, on the top wall portion 72 side, of the leg wall portion 80, which is also the edge portion, on the leg wall portion 80 side, of the top wall portion 72, is a ridge portion 102. In the ridge portion 102, the portion corresponding to the top-wall gradually-varying portion 76 and the leg-wall gradually-varying portion 84 is a gradually-varying-portion side ridge 104. The shape of the gradually-varying-portion side ridge 104 in a plan view that is viewed substantially from the inner side with respect to the lateral direction of the vehicle and the shape thereof in a side view that is viewed substantially from the front side of the vehicle substantially match. Thus, the sum of the width of the top wall portion 72, the width of the leg wall portion 80, and the width of the leg wall portion on the side, opposite to the leg wall portion 80 side, of the top wall portion 72 is substantially the same at all positions along the longitudinal direction of the top wall portion 72 (the substantially vertical direction of the vehicle) or the difference is very small even when there is some difference.

On the other hand, the center pillar lower reinforcement 110 includes a top wall portion 112, which may be regarded as a gradually-varying-portion forming wall, corresponding to the top wall portion 11 of the first embodiment. The top wall portion 112 includes a top wall body portion 114 corresponding to the lower flat portion 12 of the first embodiment. The top wall body portion 114 is formed in a plate shape of which the longitudinal direction is substantially along the vertical direction of the vehicle and the width direction is substantially along the longitudinal direction of the vehicle. In the top wall portion 112, the portion generally above the chain line Y in FIG. 9 is a top-wall gradually-varying portion 116, which may be regarded as a first gradually varying portion, corresponding to the top-wall gradually-varying portion 13 of the first embodiment. The top-wall gradually-varying portion 116, extended substantially upward with respect to the vehicle, is curved so as to be convex inward in the substantially lateral direction of the vehicle, and in addition, the width of the top-wall gradually-varying portion 116 along the substantially longitudinal direction of the vehicle appropriately decreases upward with respect to the vehicle according to the curve.

On the other hand, a leg wall portion 120 is extended from an edge portion, on the vehicle front side, of the top wall portion 112 inward in the lateral direction of the vehicle. The leg wall portion 120 corresponds to the leg wall portion 19 of the first embodiment, and is fitted with a striker with which a latch installed on a door is engaged when the door of a front seat of the vehicle is closed. In addition, the leg wall portion 120 includes a leg wall body portion 122 corresponding to the corresponding flat portion 20 of the first embodiment.

A leg-wall gradually-varying portion 124, which may be regarded as a second gradually varying portion, corresponding to the top-wall gradually-varying portion 116, is extended from an end portion, substantially on the upper side with respect to the vehicle, of the leg wall body portion 122. The leg-wall gradually-varying portion 124 corresponds to the leg-wall gradually-varying portion 21 of the first embodiment. The width of the leg-wall gradually-varying portion 124 appropriately increases and decreases according to the increase and decrease in the width of the top-wall gradually-varying portion 116, and the leg-wall gradually-varying portion 124 is twisted around an axis, extending in the longitudinal direction of the leg wall portion 120, at an appropriate angle. A flange portion 132 is extended from the edge portion, on the side opposite to the top wall portion 112 side, of the leg wall portion 120 substantially toward the front of the vehicle. A bent portion 134 that is bent inward in the lateral direction of the vehicle is formed at a predetermined position of the flange portion 132, and thus, the flange portion 132 has a step in the lateral direction of the vehicle.

On the other hand, although not shown in FIG. 9, a leg wall portion is formed also on the side, opposite to the leg wall portion 120 side, of the top wall portion 112, that is, on the rear side thereof with respect to the vehicle, and a flange portion 136 is extended from this leg wall portion on the side thereof opposite to the top wall portion 112 side substantially toward the rear of the vehicle.

A lower end portion of the center pillar upper reinforcement 70 is fitted into the center pillar lower reinforcement 110 with the above-described configuration from an upper end portion of the center pillar lower reinforcement 110, and integrally fastened thereto by fastening means, such as bolts.

In addition, in the center pillar lower reinforcement 110 with the above-described configuration, the edge portion, on the leg wall portion 120 side, of the top wall portion 112, which is also the edge portion, on the top wall portion 112 side, of the leg wall portion 120, is a ridge portion 142. In the ridge portion 142, the portion corresponding to the top-wall gradually-varying portion 116 and the leg-wall gradually-varying portion 124 is a gradually-varying-portion side ridge 144. The shape of the gradually-varying-portion side ridge 144 in a plan view that is viewed substantially from the inner side with respect to lateral direction of the vehicle and the shape thereof in a side view that is viewed substantially from the front side of the vehicle substantially match. Thus, the sum of the width of the top wall portion 112, the width of the leg wall portion 120, the width of the leg wall portion on the side, opposite to the leg wall portion 120 side, of the top wall portion 112 is substantially the same at all positions along the longitudinal direction of the top wall portion 112 (the substantially vertical direction of the vehicle) or the difference is very small even when there is some difference.

The center pillar upper reinforcement 70 and the center pillar lower reinforcement 110 with the above-described configuration are formed basically on the basis of the concept similar to that of the first embodiment. Specifically, the center pillar upper reinforcement 70 is formed to have a hat-shaped cross section such that the height of the cross section of the center pillar upper reinforcement 70 varies in the portion corresponding to the top-wall gradually-varying portion 76. However, the center pillar upper reinforcement 70 is configured so that the shape of the ridge portion 102 in a plan view that is viewed substantially from the inner side with respect to the lateral direction of the vehicle and the shape of the ridge portion 102 in a side view that is viewed substantially from the front side of the vehicle substantially match.

Thus, the increase and decrease in the width of the leg-wall gradually-varying portion 84 according to the variation in the height of the cross section of the center pillar upper reinforcement 70 are cancelled by the increase and decrease in the width of the top-wall gradually-varying portion 76. Accordingly, the sum of the width of the top wall portion 72, the width of the leg wall portion 80, and the width of the leg wall portion on the side, opposite to the leg wall portion 80 side, of the top wall portion 72 is substantially the same at all positions along the longitudinal direction of the top wall portion 72 (the substantially vertical direction of the vehicle) or the difference is very small even when there is some difference.

The center pillar lower reinforcement 110 is formed to have a hat-shaped cross section such that the height of the cross section of the center pillar lower reinforcement 110 varies in the portion corresponding to the top-wall gradually-varying portion 116. However, the center pillar lower reinforcement 110 is configured so that the shape of the ridge portion 142 in a plan view that is viewed substantially from the inner side with respect to the lateral direction of the vehicle and the shape of the ridge portion 142 in a side view that is viewed substantially from the front side of the vehicle substantially match. Thus, the increase and decrease in the width of the leg-wall gradually-varying portion 124 according to the variation in the height of the cross section of the center pillar lower reinforcement 110 are cancelled by the increase and decrease in the width of the top-wall gradually-varying portion 116. Accordingly, the sum of the width of the top wall portion 112, the width of the leg wall portion 120, and the width of the leg wall portion on the side, opposite to the leg wall portion 120 side, of the top wall portion 112 is substantially the same at all positions along the longitudinal direction of the top wall portion 112 (the substantially vertical direction of the vehicle) or the difference is very small even when there is some difference.

For the reasons as described above, the residual compressive or tensile stress in the top wall portions 72 and 112 along the width direction thereof does not occur or, if any, is very small, after forming the center pillar upper reinforcement 70 and the center pillar lower reinforcement 110. Thus, it is possible to prevent or effectively suppress the deformation, such as elastic recovery strain, or the deterioration in the dimensional accuracy due to such residual stress, and it is possible to ensure high dimensional accuracy even when a high tensile steel plate or a super high tensile steel plate is used as the material for the center pillar upper reinforcement 70 or the center pillar lower reinforcement 110. Because the high tensile steel plate or the super high tensile steel plate may be used as the material for the center pillar upper reinforcement 70 and the center pillar lower reinforcement 110 without difficulty, it is possible to reduce the weight of the vehicle body while improving the rigidity of the vehicle body and the mechanical strength of the vehicle body.

In addition, the center pillar upper reinforcement 70 and the center pillar lower reinforcement 110 are designed so that the top-wall gradually-varying portions 76 and 116 and the leg-wall gradually-varying portions 84 and 124 are not bent but gradually curved to vary the height of the cross section. Thus, it is also possible to improve the rigidity of the center pillar upper reinforcement 70 along the longitudinal direction of the top-wall gradually-varying portion 76.

Next, a modification of the center pillar lower reinforcement 110 according to the third embodiment will be described as a forth embodiment of the invention. In the description of this embodiment, the portions basically the same as those of the third embodiment are designated by the same reference numerals, and detailed description thereof is omitted.

Figure 10:
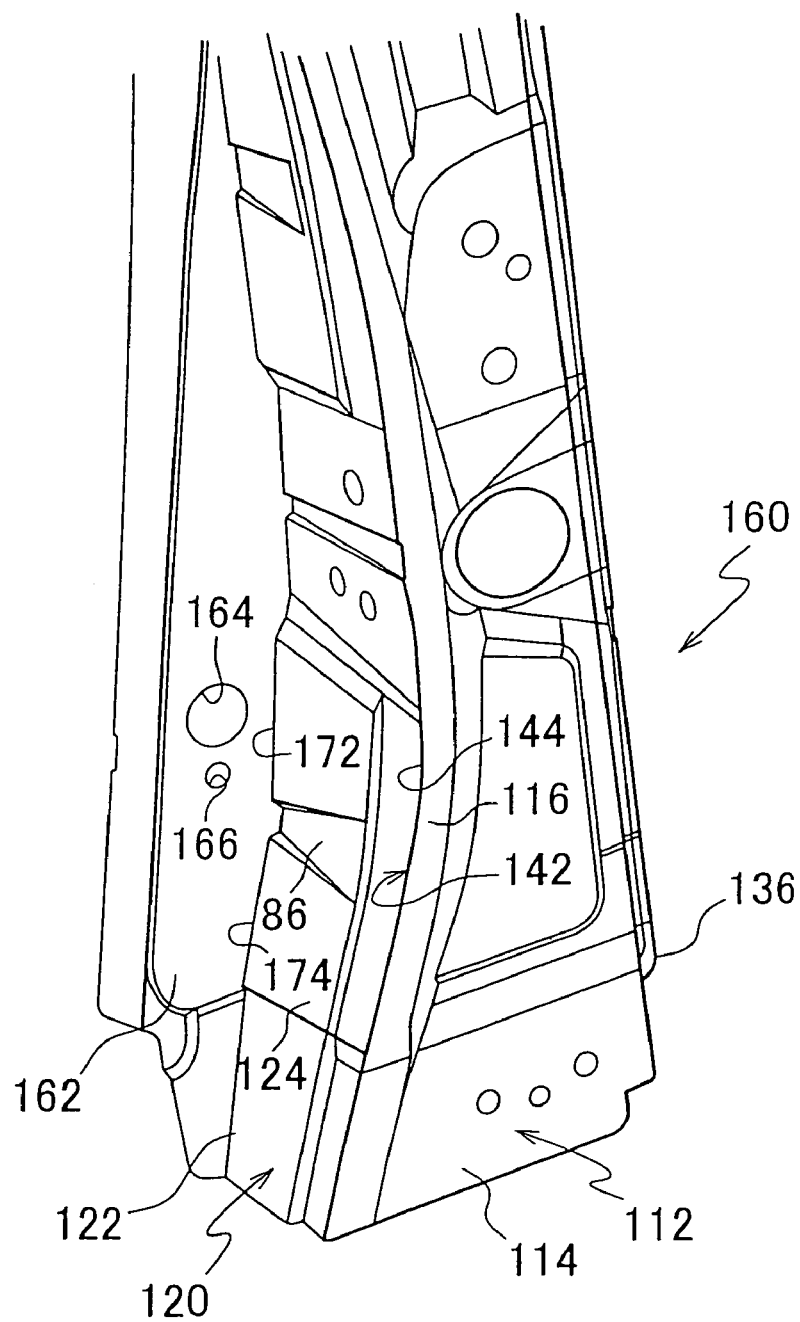
FIG. 10 is a perspective view schematically showing a configuration of a formed article for a vehicle body structural member according to a fourth embodiment of the invention.

FIG. 10 shows, in a perspective view, a schematic configuration of a center pillar lower reinforcement 160, which may be regarded as a formed article for a vehicle body structural member according to this embodiment. As shown in FIG. 10, the center pillar upper reinforcement 160 includes a flange portion 162, which may be regarded as a gradually-varying-portion forming wall, corresponding to the flange portion 132 of the third embodiment. The flange portion 162 is flat-shaped, and is fitted with a courtesy switch for detecting the door open/closed state. Holes 164 and 166 are formed in predetermined portions of the flange portion 162, passing through the flange portion 162 in the thickness direction, for engagement with the above-mentioned courtesy switch or penetration of cords connected to the courtesy switch.

In the fourth embodiment, the leg-wall gradually-varying portion 124 of the leg wall portion 120 is curved around the center of curvature located at a predetermined position on the vehicle front side of the leg wall portion 120 so as to be open substantially toward the front of the vehicle. In this embodiment, in the edge portion, on the leg wall portion 120 side, of the flange portion 162 that is the boundary between the flange portion 162 and the leg wall portion 120, edge portions 172 and 174 corresponding to the gradually-varying-portion side ridge 144 of the ridge portion 142 are curved around the center of curvature located at a predetermined position on the vehicle front side of the edge portions 172 and 174 at a curvature the same as that of the gradually-varying-portion side ridge 144.

Because the edge portions 172 and 174 corresponding to the gradually-varying-portion side ridge 144 of the ridge portion 142 are curved around the center of curvature the same as that of the gradually-varying-portion side ridge 144 at the curvature the same as that of the gradually-varying-portion side ridge 144 as described above, it is possible to prevent or remarkably effectively suppress the occurrence of wrinkles in the flange portion 162 even when the leg-wall gradually-varying portion 124 is curved so as to be open toward the front of the vehicle. Thus, it is possible to make each of the sides of the flange portion 162 with respect to the thickness direction a smooth flat surface, and it is therefore possible to reliably fix the courtesy switch thereon. In addition, because it is possible to prevent or remarkably effectively suppress the occurrence of wrinkles in the flange portion 162, it is possible to prevent or remarkably effectively suppress the deformation of the holes 164 and 166 due to wrinkles in the flange portion 162. Accordingly, neither installation of the courtesy switch nor penetration of the codes connected to the courtesy switch is hindered.

Because the center pillar lower reinforcement 160 according to the fourth embodiment has a configuration basically similar to that of the center pillar lower reinforcement 110 according to the third embodiment, the center pillar lower reinforcement 160 according to the fourth embodiment operates similarly to the center pillar lower reinforcement 110 according to the third embodiment, and brings about effects similar to those of the center pillar lower reinforcement 110 according to the third embodiment.

Next, a modification of the center pillar upper reinforcement 70 and the roof side rail outer reinforcement 94 according to the third embodiment will be described as a fifth embodiment of the invention. In the description of this embodiment, the portions basically the same as those of the third embodiment are designated by the same reference numerals, and detailed description thereof is omitted.

Figure 11:
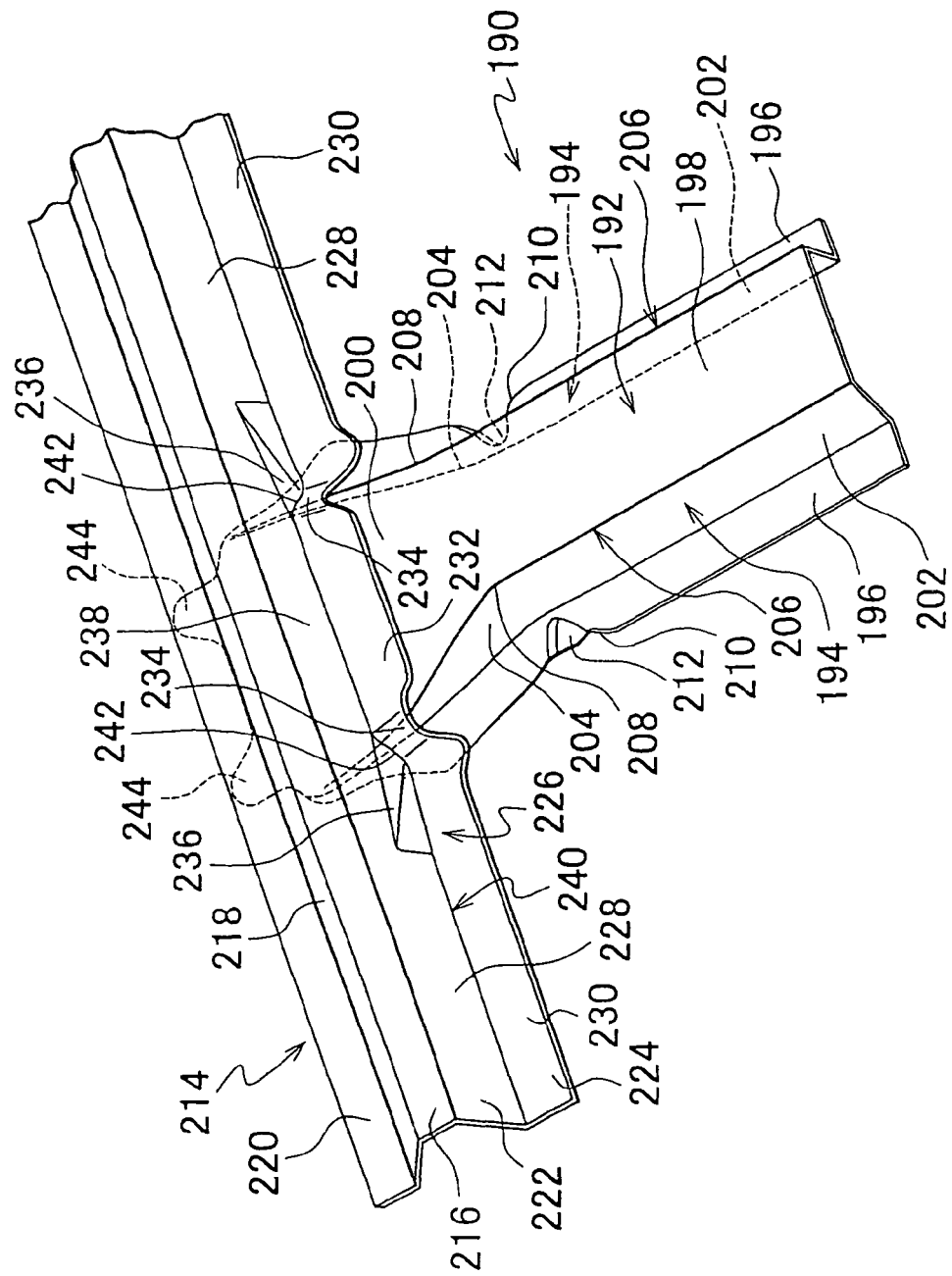
FIG. 11 is a perspective view schematically showing a configuration of a formed article for a vehicle body structural member according to a fifth embodiment of the invention.

FIG. 11 shows, in a perspective view, a schematic configuration of a main portion (vicinity of the upper end portion) of a center pillar upper reinforcement 190, which may be regarded as a formed article for a vehicle body structural member and a main portion (longitudinally intermediate portion) of a roof side rail outer reinforcement 214, which may be regarded as a formed article for a vehicle body structural member, according to the fifth embodiment.

As shown in FIG. 11, the center pillar upper reinforcement 190 includes a top wall portion 192, which may be regarded as a gradually-varying-portion forming wall. A leg wall portion 194 is extended from each of the side edge portions, with respect to the width direction, of the top wall portion 192 on one side with respect to the thickness direction of the top wall portion 192 (inward in the lateral direction of the vehicle). A flange portion 196 is extended from an edge portion, opposite to the top wall portion 192 side, of each of these leg wall portions 194 outward with respect to the width direction of the top wall portion 192, so that the center pillar upper reinforcement 190 is almost overall formed to have a hat-shaped cross section that is open inward with respect to the lateral direction of the vehicle.

The top wall portion 192 includes a top wall body portion 198 elongated along the substantially vertical direction of the vehicle, and a top-wall gradually-varying portion 200, which may be regarded as a first gradually varying portion, is continuously extended from an upper end portion, with respect to the longitudinal direction, of the top wall body portion 198. The top-wall gradually-varying portion 200 is curved so as to be gradually shifted to one side of the top wall body portion 198 (inward in the lateral direction of the vehicle) with respect to the thickness direction of the top wall body portion 198 upward, that is, toward the side opposite to the top wall body portion 198 side. In addition, the top wall body portion 198 is curved in this way, while the width thereof increases so that each of the side edges with respect to the width direction is gradually shifted outward in the width direction.

On the other hand, the leg wall portion 194 includes a leg wall body portion 202 corresponding to the top wall body portion 198, and a leg-wall gradually-varying portion 204, which may be regarded as a second gradually varying portion, corresponding to the top-wall gradually-varying portion 200 is integrally extended from the upper end portion of the leg wall body portion 202. The width of the leg-wall gradually-varying portion 204 is gradually reduced upward, that is, toward the side opposite to the leg wall body portion 202 side. In addition, the leg-wall gradually-varying portion 204 is twisted around an axis extending in the longitudinal direction of the leg wall portion 194, and the increment of the width of the above-described top wall body portion 198 is canceled by the decrement of the widths of both leg-wall gradually-varying portions 204.

In addition, of ridge portions 206 of the top wall portion 192, which are side edge portions with respect to the width direction of the top wall portion 192, gradually-varying-portion side ridges 208 each positioned between the top-wall gradually-varying portion 200 and the leg-wall gradually-varying portion 204 has the same shape both when the center pillar upper reinforcement 190 is viewed from the side opposite to the flange portion 196 side of the top wall portion 192 along the thickness direction of the top wall body portion 198, that is, in a plan view of the center pillar upper reinforcement 190, and when the center pillar upper reinforcement 190 is viewed along the width direction of the top wall body portion 198, that is, in a side view of the center pillar upper reinforcement 190.

On the other hand, in the vicinity of the end portion, on the leg wall body portion 202 side, of the above-described leg-wall gradually-varying portion 204, a concave portion 210 is formed in each of the flange portions 196. Each of the concave portions 210 is formed by cutting away the edge portion, on the side opposite to the leg wall portion 194 side, of the flange portion 196 in a concave shape that is curved so as to be open outward with respect to the flange portion 196. In addition, a step 212 is formed in each of the flange portions 196 at the portion in which the concave portion 210 is formed. In the step portion 212, the flange portion 196 is deformed so as to be stepped toward the side opposite to the top wall portion 192 side, so that the warp is absorbed that is caused in the flange portion 196 when, due to the formation of the top-wall gradually-varying portion 200 and the leg-wall gradually-varying portion 204, the flange portion 196 is curved around the center of curvature located at a predetermined position on the side opposite to the leg wall portion 194 side with respect to the width direction of the flange portion 196.

Meanwhile, a roof side rail outer reinforcement 214 to which an upper end of the center pillar upper reinforcement 190 is joined includes a top wall portion 216. The top wall portion 216 is formed in a plate shape so that the longitudinal direction of the top wall portion 216 is substantially along the longitudinal direction of the vehicle, and the width direction of the top wall portion 216 is substantially along the width direction of the vehicle as in the case of the top wall body portion 198 of the center pillar upper reinforcement 190. A leg wall portion 218 is continuously extended from an edge portion, on one side with respect to the width direction (substantially on the upper side with respect to the vehicle), of the top wall portion 216 to one of the sides, with respect to generally the thickness direction of the top wall portion 216 (generally inward in the substantially lateral direction of the vehicle), and a flange portion 220 is extended from an edge portion, on the side opposite to the top wall portion 216 side, of the leg wall portion 218 outward in the width direction of the top wall portion 216 (substantially upward with respect to the vehicle).

On the other hand, a leg wall portion 222 is continuously extended from an edge portion, on the other side with respect to the width direction (substantially on the lower side with respect to the vehicle), of the top wall portion 216 to one of the sides, with respect to generally the thickness direction of the top wall portion 216 (generally inward in the substantially lateral direction of the vehicle), and a flange portion 224 is extended from an edge portion, on the side opposite to the top wall portion 216 side, of the leg wall portion 222, which may be regarded as the gradually-varying-portion forming wall, outward in the width direction of the top wall portion 216 (substantially upward with respect to the vehicle). Specifically, the roof side rail outer reinforcement 214 is formed to have a hat-shaped cross section that is almost overall open to inward with respect to the lateral direction of the vehicle.

An insertion portion 226 is formed in the longitudinally intermediate portion of the top wall portion 216. The insertion portion 226 is formed by partially deforming the leg wall portion 222 and the flange portion 224. The portions of the leg wall portion 222 on either side of the insertion portion 226 with respect to the longitudinal direction of the top wall 216 are corresponding flat portions 228. The portions of the flange portions 224 on either side of the insertion portion 226 with respect to the longitudinal direction of the top wall 216 are lower flat portions 230.

The insertion portion 226 includes an upper flat portion 232. The upper flat portion 232 is formed in a plate shape so that the thickness direction of the upper flat portion 232 coincides with the thickness direction of the lower flat portion 230. The edge portion, on the leg wall portion 222 side, of the upper flat portion 232 is shifted, relative to the edge portion, on the leg wall portion 222 side, of the lower flat portion 230, to the top wall portion 216 side by the amount corresponding to the height of the cross section of the center pillar upper reinforcement 190 in the portion in which the top-wall gradually-varying portion 200 is formed. Thus, in the portion where the upper flat portion 232 is formed, the height of the cross section of the portion of the roof side rail outer reinforcement 214 on the lower side, with respect to the vehicle, relative to the center with respect to the width direction of the roof-side rail outer reinforcement 214 is lower than that of the portion of the roof side rail outer reinforcement 214 in which the corresponding flat portions 228 and the lower flat portions 230 are provided.

A flange gradually-varying portion 234, which may be regarded as a first gradually varying portion, is continuously extended from each end, with respect to the longitudinal direction of the top wall portion 216, of the upper flat portion 232. The end portion, on the side opposite to the upper flat portion 232 side, of the flange gradually-varying portion 234 is connected to the lower flat portion 230. The flange gradually-varying portion 234 is curved around the center of curvature located on the side opposite to the top wall portion 216 side with respect to the thickness direction of the upper flat portion 232 between the end portion, on the upper flat portion 232 side, of the flange gradually-varying portion 234 and a predetermined position that is located between the end portion, on the upper flat portion 232 side, of the flange gradually-varying portion 234 and the end portion thereof on the lower flat portion 230 side. Meanwhile, the flange gradually-varying portion 234 is curved around the center of curvature located on the top wall portion 216 side with respect to the thickness direction of the upper flat portion 232 between the end portion, on the lower flat portion 230 side, of the flange gradually-varying portion 234 and the predetermined position that is located between the end portion, on the upper flat portion 232 side, of the flange gradually-varying portion 234 and the end portion thereof on the lower flat portion 230 side.

Leg-wall gradually-varying portions 236, which may be regarded as second gradually-varying portions, are formed in the corresponding flat portions 228 corresponding to the flange gradually-varying portions 234. In the roof side rail outer reinforcement 214, the leg-wall gradually-varying portion 236 is provided in the leg wall portion 222 between the corresponding flat portion 228 and a corresponding flat portion 238 joined with the upper flat portion 232 at the edge portion, on the side opposite to the top wall 216 side, of the corresponding flat portion 238.

The leg-wall gradually-varying portion 236 is formed by inclining the width direction of part of the leg wall portion 222 relative to the width direction of the corresponding flat portions 228 or the corresponding flat portion 238 in the longitudinal direction and the thickness direction of the top wall portion 216. In a ridge portion 240 that is an edge portion, on the leg wall portion 222 side, of the flange portion 224 and at the same time an edge portion, on the flange portion 224 side, of the leg wall portion 222, a gradually-varying-portion side ridge 242 that is located at the boundary between the leg-wall gradually-varying portion 236 and the flange gradually-varying portion 234 is curved around the center of curvature located on the outer side, with respect to the width direction, of the top wall portion 216, that is, on the side opposite to the leg wall portion 222 side, from the end portion, on the upper flat portion 232 side, of the gradually-varying-portion side ridge 242 to a predetermined position that is located between the end portion, on the upper flat portion 232 side, of the gradually-varying-portion side ridge 242 and the end portion thereof on the lower flat portion 230 side. Meanwhile, with regard to the tower flat portion 230 side, the gradually-varying-portion side ridge 242 is curved around the center of curvature located on the inner side with respect to the width direction of the top wall portion 216, that is, on the leg wall portion 222 side, between the end portion, on the lower flat portion 230 side, of the gradually-varying-portion side ridge 242 and the predetermined position that is located between the end portion, on the upper flat portion 232 side, of the gradually-varying-portion side ridge 242 and the end portion thereof on the lower flat portion 230 side.

Specifically, when the roof side rail outer reinforcement 214 is viewed along the thickness direction of the top wall portion 216 from the side opposite to the top wall portion 216 side with respect to the top wall portion 216, that is, in a plan view of the roof side rail outer reinforcement 214, the gradually-varying-portion side ridge 242 is gently curved in a substantially S-shape as a whole, so that the edge portion, on the leg wall portion 222 side, of the flange gradually-varying portion 234 is shifted closer to the center of the top wall portion 216 with respect to the width direction on the upper flat portion 232 side than on the lower flat portion 230 side.

When the flange gradually-varying portion 234 that is gently curved in this way is considered as being straight on purpose, the flange gradually-varying portion 234 is inclined at substantially 45 degrees both in the substantially lateral direction of the vehicle and in the substantially vertical direction of the vehicle with respect to the substantially longitudinal direction of the vehicle. In addition, the width of the leg-wall gradually-varying portion 236 increases and decreases according to the shift of the edge portion, on the leg wall portion 222 side with respect to the width direction of the flange portion 224, of the flange gradually-varying portion 234, and the increase and decrease in the width of the leg-wall gradually-varying portion 236 cancel the shift of the edge portion, on the leg wall portion 222 side, of the flange gradually-varying portion 234.

In addition, the gradually-varying-portion side ridge 242 has substantially the same shape both when the above-described roof side rail outer reinforcement 214 is viewed from the top and when the roof side rail outer reinforcement 214 is viewed from the flange portion 224 side along the width direction of the top wall portion 216, that is, when the roof side rail outer reinforcement 214 is viewed from a side. The shape of the flange gradually-varying portion 234 and the shape of the leg-wall gradually-varying portion 236 are determined so that the gradually-varying-portion side ridge 242 has substantially the same shape both in a plan view and in a side view.

In the insertion portion 226 with the above-described configuration, the upper end of the center pillar upper reinforcement 190 is passed on one side, with respect to the thickness direction of the upper flat portion 232 (the side opposite to the top wall portion 216 side), and the center pillar upper reinforcement 190 and the roof side rail outer reinforcement 214 are integrally joined by fixing the top-wall gradually-varying portion 200 to the upper flat portion 232 by welding or the like, and fixing fixation tabs 244 extended from upper end portions of the top-wall gradually-varying portion 200 to the flange portion 220 by welding or the like.

In summary, the fifth embodiment with the above-described configuration has a configuration obtained by applying the first embodiment to the center pillar upper reinforcement 190 and applying the second embodiment to the roof side rail outer reinforcement 214 at the joint between the center pillar upper reinforcement 190 and the roof side rail outer reinforcement 214.

In the fifth embodiment with the above-described configuration, the center pillar upper reinforcement 190 is almost overall formed to have a substantially hat-shaped cross section. In addition, the center pillar upper reinforcement 190 is formed so that the top wall portion 192 is shifted to the flange portion 196 side near the end portion on the upper side with respect to the vehicle, and thus, the height of the cross section of the center pillar upper reinforcement 190 is gradually reduced upward with respect to the vehicle.

The center pillar upper reinforcement 190 is configured so that the shape of the gradually-varying-portion side ridge 208 in a plan view that is viewed substantially from the inner side with respect to the lateral direction of the vehicle and the shape of the gradually-varying-portion side ridge 208 in a side view that is viewed substantially from the front side or the rear side of the vehicle substantially match. In addition, the increase and decrease in the width of the top-wall gradually-varying portion 200 according to the variation in the height of the cross section of the center pillar upper reinforcement 190 are cancelled by the increase and decrease in the width of the leg-wall gradually-varying portion 204. Thus, the sum of the widths of the leg wall portions 194 and the width of the top wall portion 192 in the portion of the center pillar upper reinforcement 190 in which the height of the cross section varies, that is, in the portion corresponding to the gradually-varying-portion side ridge 208 of the ridge portion 206 is substantially constant along the longitudinal direction (substantially vertical direction of the vehicle) of the top wall portion 192, or the difference is very small even when there is some difference.

For the reasons as described above, the residual compressive or tensile stress in the center pillar upper reinforcement 190 along the width direction of the top wall portion 192 does not occur or, if any, is very small, after forming the center pillar upper reinforcement 190. Thus, it is possible to prevent or effectively suppress the deformation, such as elastic recovery strain and cutting (break), or the deterioration in the dimensional accuracy of the center pillar upper reinforcement 190 due to such residual stress, and it is possible to ensure high dimensional accuracy even when a high tensile steel plate or a super high tensile steel plate is used as the material for the center pillar upper reinforcement 190. Because the high tensile steel plate or the super high tensile steel plate may be used as the material for the center pillar upper reinforcement 190 without difficulty, it is possible to reduce the weight of the vehicle body while improving the rigidity of the vehicle body and the mechanical strength of the vehicle body.

Meanwhile, the roof side rail outer reinforcement 214 is almost overall formed to have a substantially hat-shaped cross section. In addition, the insertion portion 226 is formed in the longitudinally intermediate portion of the top wall portion 216 on the side on which the leg wall portion 222 and the flange portion 224 are present, and as a result, in a side view that is viewed from the leg wall portion 222 side, the insertion portion 226 has a concave shape that is open inward with respect to the substantially lateral direction of the vehicle.

The roof side rail outer reinforcement 214 is configured so that the shape of the gradually-varying-portion side ridge 242 in a plan view that is viewed substantially from the inner side with respect to the lateral direction of the vehicle and the shape of the gradually-varying-portion side ridge 242 in a side view that is viewed substantially from the lower side with respect to the vehicle substantially match. In addition, the increase and decrease in the width of the flange gradually-varying portion 234 according to the variation in the height of the cross section of the roof side rail outer reinforcement 214 are cancelled by the increase and decrease in the width of the leg-wall gradually-varying portion 236 in the insertion portion 226. Thus, the sum of the width of the flange portion 224 and the width of the leg wall portion 222 in the portion corresponding to the flange gradually-varying portion 234 is substantially constant along the longitudinal direction (substantially longitudinal direction of the vehicle) of the top wall portion 216, or the difference is very small even when there is some difference.

For the reasons as described above, the residual compressive or tensile stress in the roof side rail outer reinforcement 214 along the width direction of the top wall portion 216 does not occur or, if any, is very small, after forming the roof side rail outer reinforcement 214. Thus, it is possible to prevent or effectively suppress the deformation, such as elastic recovery strain and cutting (break), or the deterioration in the dimensional accuracy of the roof side rail outer reinforcement 214 due to such residual stress, and it is possible to ensure high dimensional accuracy even when a high tensile steel plate or a super high tensile steel plate is used as the material for the roof side rail outer reinforcement 214. Because the high tensile steel plate or the super high tensile steel plate may be used as the material for the roof side rail outer reinforcement 214 without difficulty, it is possible to reduce the weight of the vehicle body while improving the rigidity of the vehicle body and the mechanical strength of the vehicle body.

As described above, in the fifth embodiment, it is possible to form the center pillar upper reinforcement 190 such that the height of the top wall portion 192 is gradually reduced on the upper end side, and in addition, it is possible to form the insertion portion 226 in the roof side rail outer reinforcement 214, the insertion portion 226 having a shape open inward in the lateral direction of the vehicle without cutting significantly large part of the leg wall portion 222 and the flange portion 224. Thus, as shown in FIG. 11, it is possible to fit the portion, near the upper end portion, of the center pillar upper reinforcement 190 on the inner side, with respect to the lateral direction of the vehicle, of the top wall portion 216 at the insertion portion 226 without causing the center pillar upper reinforcement 190 to make a large step in the lateral direction of the vehicle in the roof side rail outer reinforcement 214, and to integrally join the center pillar upper reinforcement 190 and the roof side rail outer reinforcement 214 in this state.

When the center pillar upper reinforcement 190 and the roof side rail outer reinforcement 214 are joined in this way, the center pillar upper reinforcement 190 may receive part of a load (more specifically, the load that is transmitted through the lower flat portion 230 and the leg wall portion 222 along the longitudinal direction of the roof side rail outer reinforcement 214) when the load is applied to the roof side rail outer reinforcement 214 along the substantially longitudinal direction of the vehicle, and it is possible to improve the rigidity of a vehicle body.

In addition, as described above, there is no need to cut significantly large part of the leg wall portion 222 and the flange portion 224 when the insertion portion 226 is formed in the roof side rail outer reinforcement 214, and therefore, it is possible to prevent or effectively suppress the drop in the mechanical strength and/or the rigidity of the roof side rail outer reinforcement 214.

Next, a modification of the fifth embodiment will be described as a sixth embodiment. In the description of this embodiment, the portions basically the same as those of the fifth embodiment are designated by the same reference numerals, and detailed description thereof is omitted.

Figure 12:
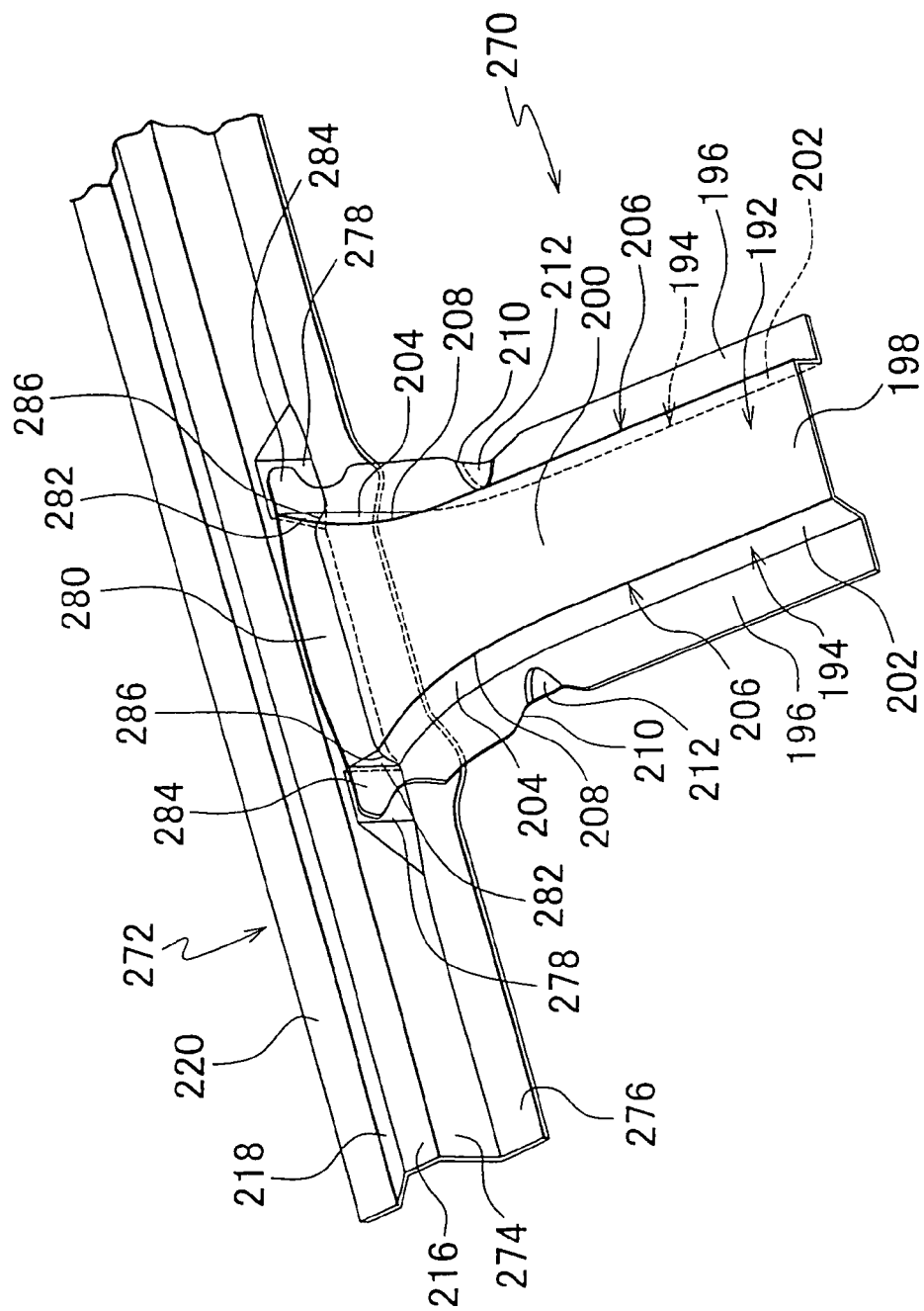
FIG. 12 is a perspective view schematically showing a configuration of a formed article for a vehicle body structural member according to a sixth embodiment of the invention.

FIG. 12 shows, in a perspective view, a schematic configuration of a main portion (vicinity of the upper end portion) of a center pillar upper reinforcement 270 and a main portion (longitudinally intermediate portion) of a roof side rail outer reinforcement 272, which are formed articles for a vehicle body structural member, according to the sixth embodiment.

As shown in FIG. 12, unlike the roof side rail outer reinforcement 214 of the fifth embodiment, the roof side rail outer reinforcement 272 of the sixth embodiment includes neither the leg wall portion 222 nor the flange portion 224, and therefore, the insertion portion 226 is not formed. The roof side rail outer reinforcement 272 includes a leg wall portion 274 instead of the above-described leg wall portion 222, and includes a flange portion 276 instead of the flange portion 224. A pair of projections 278 are formed in the intermediate portion, with respect to the longitudinal direction of the top wall portion 216, of the leg wall portion 274 in a state where the pair of projections 278 are spaced apart by a predetermined interval in the longitudinal direction of the top wall portion 216. In the projections 278, the surface, on the flange portion 276 side, of the leg wall portion 274 is further inclined toward the top wall portion 216 side than in the other portion of the leg wall portion 274.

Meanwhile, as described above, the insertion portion 226 is not formed in the roof side rail outer reinforcement 272, and therefore, the top-wall gradually-varying portion 200 and the leg-wall gradually-varying portion 204 are positioned on the outer side, with respect to the substantially lateral direction of the vehicle, of the flange portion 220 that is located on the lower side of the top wall portion 216. In the sixth embodiment, a top wall fixation tab 280, which may be regarded as a first gradually varying portion, is extended from the tip (upper end) of the top-wall gradually-varying portion 200 of the center pillar upper reinforcement 270. The top wall fixation tab 280 is extended from and bent at the tip of the top-wall gradually-varying portion 200 so as to follow the surface, on the flange portion 276 side, of the leg wall portion 274, and fixed to the leg wall portion 274 between the projections 278 by welding or the like.

On the other hand, a leg-wall gradually-varying portion 282 is extended from an end portion, opposite to the leg wall body portion 202 side, of the leg-wall gradually-varying portion 204, corresponding to the top wall fixation tab 280. The leg-wall gradually-varying portions 282 are respectively continuous with two end portions, with respect to the width direction, of the top wall fixation tab 280. In addition, a flange fixation tab 284 is continuously extended from the tip (upper end) of each of the flange portions 196. The flange fixation tabs 284 are formed corresponding to the projections 278, and extended from and bent at the tip (upper end) of the flange portions 196 so as to follow the surface, on the flange portion 276 side, of the projections 278, and fixed to the respective projections 278 by welding or the like.

In the sixth embodiment, a ridge portion 286 that is the boundary between the leg-wall gradually-varying portion 204 and the leg-wall gradually-varying portion 282 is curved in substantially the same shape both in a plan view that is viewed along the thickness direction of the top wall body portion 198 and in a front view that is viewed from the side, opposite to the top-wall gradually-varying portion 200 side, with respect to the top wall fixation tab 280 (in a top view with respect to the vehicle). Because the ridge portion 286 is curved in this way, even when the top wall fixation tab 280, the leg-wall gradually-varying portions 282, and the flange fixation tabs 284 are formed, the residual compressive or tensile stress in the top wall fixation tabs 280 along the width direction thereof does not occur or, if any, is very small after forming the center pillar upper reinforcement 270.

Thus, it is possible to prevent or effectively suppress the deformation, such as elastic recovery strain and cutting (break), or the deterioration in the dimensional accuracy of the center pillar upper reinforcement 270 due to such residual stress, and it is possible to ensure high dimensional accuracy even when a high tensile steel plate or a super high tensile steel plate is used as the material for the center pillar upper reinforcement 270. Because the high tensile steel plate or the super high tensile steel plate may be used as the material for the center pillar upper reinforcement 270 without difficulty, it is possible to reduce the weight of the vehicle body while improving the rigidity of the vehicle body and the mechanical strength of the vehicle body.

In addition, because the top-wall gradually-varying portion 200 and the leg-wall gradually-varying portion 204 are similar to those of the fifth embodiment, concerning these portions, the effects similar to those of the fifth embodiment may be achieved.

Needless to say, although, in the third to sixth embodiments, the invention is applied to the center pillar upper reinforcement 70, 190, or 270, and the center pillar upper reinforcement 110 or 214, the invention may be applied to another member such as a roof side upper reinforcement, a frame member that is a component of the frame of the vehicle body, etc.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

The invention claimed is:

1. A formed article for a vehicle body structural member in which a pair of leg wall portions are extended to one side of thickness direction of a top wall portion from respective edge portions with respect to width direction of the top wall portion, characterized by comprising:

a first gradually varying portion that is provided in the top wall portion between two end portions with respect to a longitudinal direction of the top wall portion and is continuously extended from one end side to another end side in the longitudinal direction of the top wall portion so that the first gradually varying portion is curved around an axis extending in the width direction of the top wall portion and so that width of the top wall portion varies; and a second gradually varying portion that is provided in at least one of the pair of leg wall portions according to a location in which the first gradually varying portion is provided in the top wall portion, and is continuously extended from the one end side to the other end side in the longitudinal direction of the top wall portion, wherein a sum of the width of the top wall portion in the first gradually varying portion and width of the pair of the leg wall portions in the second gradually varying portion is constant or hardly varies along the longitudinal direction of the top wall portion, wherein a shape of a gradually-varying-portion ridge that is a sharp boundary between the first gradually varying portion and the second gradually varying portion is made substantially the same both in a plan view that is viewed along the thickness direction of the top wall portion and in a side view that is viewed along the width direction of the top wall portion.

2. The formed article for a vehicle body structural member according to claim 1, wherein:

on a side of a predetermined position in the longitudinal direction of the top wall portion on which side the width of the top wall portion is greater than that on another side, the first gradually varying portion is curved around an axis extending in the width direction of the top wall portion, wherein a center of curvature of the first gradually varying portion is located on one side with respect to the thickness direction of the top wall portion, and on a side of the predetermined position in the longitudinal direction of the top wall portion on which side the width of the top wall portion is less than that on the other side, the first gradually varying portion is curved around an axis extending in the width direction of the top wall portion, wherein a center of curvature of the first gradually varying portion is located on another side with respect to the thickness direction of the top wall portion.

3. The formed article for a vehicle body structural member according to claim 1, further comprising a flange portion extended from an edge portion of the leg wall portion on a side opposite to the top wall portion side.

4. A formed article for a vehicle body structural member in which a pair of leg wall portions are extended to one side of thickness direction of a top wall portion from respective edge portions with respect to width direction of the top wall portion, and a flange portion is extended outward in the width direction of the top wall portion from an edge portion on a side opposite to the top wall portion side of at least one of the pair of leg wall portions, characterized by comprising:

a first gradually varying portion that is provided in a gradually-varying-portion forming wall that is at least one of the top wall portion and the flange portion, between two end portions with respect to a longitudinal direction of the gradually-varying-portion forming wall and is continuously extended from one end side to another end side in the longitudinal direction of the gradually-varying-portion forming wall so that an edge portion on the leg wall portion side with respect to a width direction of the first gradually varying portion is curved around an axis extending in a width direction of the gradually-varying-portion forming wall, which causes the width of the gradually-varying-portion forming wall to vary; and a second gradually varying portion that is provided in at least one of the pair of leg wall portions according to a location in which the first gradually varying portion is provided in the gradually-varying-portion forming wall, and that is continuously extended from the one end side to the other end side in the longitudinal direction of the gradually-varying-portion forming wall, wherein a sum of the width of the gradually-varying portion forming wall in the first gradually varying portion and a width of the pair of leg wall portions is constant or hardly varies along the longitudinal direction of the gradually-varying portion forming wall, wherein a shape of a gradually-varying-portion ridge that is a sharp boundary between the first gradually varying portion and the second gradually varying portion is made substantially the same both in a plan view that is viewed along the thickness direction of the top wall portion and in a side view that is viewed along the width direction of the top wall portion.

5. The formed article for a vehicle body structural member according to claim 4, wherein:

on a side of a predetermined position in the longitudinal direction of the gradually-varying-portion forming wall on which side the width of the gradually-varying-portion forming wall is greater than that on another side, the first gradually varying portion is curved around an axis extending in the width direction of the gradually-varying-portion forming wall, wherein a center of curvature of the first gradually varying portion is located on one side with respect to a thickness direction of the gradually-varying-portion forming wall, and on a side of the predetermined position in the longitudinal direction of the gradually-varying-portion forming wall on which side the width of the gradually-varying-portion forming wall is less than that on another side, the first gradually varying portion is curved around an axis extending in the width direction of the gradually-varying-portion forming wall, wherein a center of curvature of the first gradually varying portion is located on the other side with respect to the thickness direction of the gradually-varying-portion forming wall.

6. The formed article for a vehicle body structural member according to claim 1, wherein the second gradually varying portion is twisted around an axis extending in a longitudinal direction of the leg wall portion according to the variation in height of a cross section of the first gradually varying portion and the variation in width of the first gradually varying portion.

7. The formed article for a vehicle body structural member according to claim 1, wherein the first gradually varying portion and the second gradually varying portion corresponding to the first gradually varying portion are gradually curved.

8. The formed article for a vehicle body structural member according to claim 1, wherein the first gradually varying portion is formed substantially symmetrically with respect to a center with respect to the width direction of the top wall portion.

9. The formed article for a vehicle body structural member according to claim 1, wherein in the second gradually varying portion and the pair of leg wall portions are formed substantially symmetrically.

10. The formed article for a vehicle body structural member according to claim 1, wherein the first gradually varying portion and the second gradually varying portion are each formed in a plate shape.

11. The formed article for a vehicle body structural member according to claim 1, wherein the formed article for a vehicle body structural member is formed by drawing.

12. The formed article for a vehicle body structural member according to claim 1, wherein the formed article for a vehicle body structural member is made of a super high tensile steel plate.

13. The formed article for a vehicle body structural member according to claim 1, wherein the formed article for a vehicle body structural member is used in a center pillar upper reinforcement provided along a center pillar of a vehicle body.

14. The formed article for a vehicle body structural member according to claim 1, wherein the formed article for a vehicle body structural member is used in a center pillar lower reinforcement provided along a center pillar of a vehicle body.

15. The formed article for a vehicle body structural member according to claim 1, wherein the formed article for a vehicle body structural member is used in a roof side rail outer reinforcement provided along a roof side of a vehicle body.

16. The formed article for a vehicle body structural member according to claim 4, wherein the second gradually varying portion is twisted around an axis extending in a longitudinal direction of the leg wall portion according to the variation in height a of cross section of the first gradually varying portion and the variation in width of the first gradually varying portion.

17. The formed article for a vehicle body structural member according to claim 4, wherein the first gradually varying portion and the second gradually varying portion corresponding to the first gradually varying portion are gradually curved.

18. The formed article for a vehicle body structural member according to claim 4, wherein the first gradually varying portion is formed substantially symmetrically with respect to a center with respect to the width direction of the top wall portion.

19. The formed article for a vehicle body structural member according to claim 4, wherein in the second gradually varying portion and the pair of leg wall portions are formed substantially symmetrically.

20. The formed article for a vehicle body structural member according to claim 4, wherein the first gradually varying portion and the second gradually varying portion are each formed in a plate shape.

21. The formed article for a vehicle body structural member according to claim 4, wherein the formed article for a vehicle body structural member is formed by drawing.

22. The formed article for a vehicle body structural member according to claim 4, wherein the formed article for a vehicle body structural member is made of a super high tensile steel plate.

23. The formed article for a vehicle body structural member according to claim 4, wherein the formed article for a vehicle body structural member is used in a center pillar upper reinforcement provided along a center pillar of a vehicle body.

24. The formed article for a vehicle body structural member according to claim 4, wherein the formed article for a vehicle body structural member is used in a center pillar lower reinforcement provided along a center pillar of a vehicle body.

25. The formed article for a vehicle body structural member according to claim 4, wherein the formed article for a vehicle body structural member is used in a roof side rail outer reinforcement provided along a roof side of a vehicle body.

* * * * *